(12) United States Patent
Cha et al.

(10) Patent No.: US 10,061,825 B2
(45) Date of Patent: Aug. 28, 2018

(54) METHOD OF RECOMMENDING FRIENDS, AND SERVER AND TERMINAL THEREFOR

(71) Applicant: SAMSUNG ELECTRONICS CO., LTD., Suwon-si (KR)

(72) Inventors: Sang-ok Cha, Suwon-si (KR); Sang-ho Yi, Seoul (KR); Jae-hyuck Shin, Suwon-si (KR); Yoon-kyong Lee, Seoul (KR); Hyun-jin Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 175 days.

(21) Appl. No.: 13/975,539

(22) Filed: Aug. 26, 2013

(65) Prior Publication Data
US 2014/0059040 A1    Feb. 27, 2014

(30) Foreign Application Priority Data

Aug. 24, 2012 (KR) .................. 10-2012-0093254
Apr. 26, 2013 (KR) .................. 10-2013-0046927

(51) Int. Cl.
G06F 17/30 (2006.01)
G06Q 30/02 (2012.01)
G06Q 50/00 (2012.01)

(52) U.S. Cl.
CPC .... *G06F 17/30554* (2013.01); *G06F 17/3069* (2013.01); *G06Q 30/0241* (2013.01); *G06Q 30/0277* (2013.01); *G06Q 50/01* (2013.01)

(58) Field of Classification Search
CPC ......... G06F 17/30029; G06F 17/30867; G06F 17/30699; G06F 17/3069; G06F 17/30554
See application file for complete search history.

(56) References Cited

U.S. PATENT DOCUMENTS 5,428,778 A * 6/1995 Brookes ............ G06F 17/30699
                                                                707/661
6,094,652 A * 7/2000 Faisal ................. G06F 17/3064
(Continued)

FOREIGN PATENT DOCUMENTS

CN        102411596 A      4/2012
JP       2003-16098 A      1/2003
(Continued)

OTHER PUBLICATIONS

International Search Report dated Dec. 16, 2013 in counterpart International Application No. PCT/KR2013/007577 (PCT/ISA/210/220).

(Continued)

*Primary Examiner* — Rehana Perveen
*Assistant Examiner* — Huen Wong
(74) *Attorney, Agent, or Firm* — Sughrue Mion, PLLC

(57) ABSTRACT

A method of recommending a friend in a first terminal is provided. The method includes generating first interest keyword information by analyzing event information of the first terminal, receiving second interest keyword information of a second terminal, comparing the first interest keyword information and the second interest keyword information, and displaying information recommending a user of the second terminal as a friend based on a result of the comparing.

23 Claims, 22 Drawing Sheets

(56) References Cited

U.S. PATENT DOCUMENTS

| | | | |
|---|---|---|---|
| 8,229,942 B1* | 7/2012 | Hubinette | G06Q 30/02 |
| | | | 707/713 |
| 8,751,427 B1* | 6/2014 | Mysen | H04L 67/306 |
| | | | 705/14.58 |
| 2001/0029183 A1* | 10/2001 | Ito | G06Q 30/02 |
| | | | 455/456.6 |
| 2003/0105589 A1* | 6/2003 | Liu | G06F 17/30017 |
| | | | 702/1 |
| 2006/0242122 A1* | 10/2006 | DeVorchik | G06F 17/30106 |
| 2006/0242164 A1* | 10/2006 | Evans | G06F 17/301 |
| 2007/0011155 A1* | 1/2007 | Sarkar | G06F 17/30722 |
| 2007/0232342 A1* | 10/2007 | Larocca | H04M 1/67 |
| | | | 455/518 |
| 2007/0282621 A1 | 12/2007 | Altman et al. | |
| 2008/0140650 A1 | 6/2008 | Stackpole | |
| 2008/0177726 A1* | 7/2008 | Forbes | G06Q 30/02 |
| 2009/0163183 A1 | 6/2009 | O'Donoghue et al. | |
| 2009/0164400 A1 | 6/2009 | Amer-Yahia et al. | |
| 2009/0201896 A1* | 8/2009 | Davis | H04W 84/18 |
| | | | 370/338 |
| 2010/0111372 A1 | 5/2010 | Zheng et al. | |
| 2010/0146091 A1* | 6/2010 | Curtis | G06F 15/173 |
| | | | 709/223 |
| 2010/0216491 A1 | 8/2010 | Winkler et al. | |
| 2010/0227594 A1* | 9/2010 | De Vries | H04L 12/5895 |
| | | | 455/414.1 |
| 2011/0028129 A1 | 2/2011 | Hutchison et al. | |
| 2011/0078603 A1* | 3/2011 | Koomullil | G06F 17/30386 |
| | | | 715/769 |
| 2011/0081923 A1 | 4/2011 | Forutanpour et al. | |
| 2011/0093415 A1 | 4/2011 | Rhee et al. | |
| 2011/0113119 A1* | 5/2011 | Frazier | G06F 17/30041 |
| | | | 709/217 |
| 2011/0136502 A1* | 6/2011 | Hubner | H04W 4/02 |
| | | | 455/456.1 |
| 2011/0142016 A1 | 6/2011 | Chatterjee | |
| 2011/0258303 A1* | 10/2011 | Nath | G06F 9/468 |
| | | | 709/223 |
| 2011/0264743 A1* | 10/2011 | Baumert | G06F 1/1632 |
| | | | 709/204 |
| 2012/0041769 A1 | 2/2012 | Dalal et al. | |
| 2012/0166578 A1 | 6/2012 | Hong | |
| 2012/0188382 A1 | 7/2012 | Morrison et al. | |
| 2012/0215771 A1* | 8/2012 | Steiner | G06F 17/30528 |
| | | | 707/723 |
| 2013/0132194 A1* | 5/2013 | Rajaram | G06Q 50/01 |
| | | | 705/14.52 |
| 2013/0136363 A1 | 5/2013 | Na | |
| 2013/0275503 A1* | 10/2013 | Sul | G06Q 10/10 |
| | | | 709/203 |
| 2013/0304743 A1* | 11/2013 | Kurokawa | G06F 17/30598 |
| | | | 707/740 |
| 2013/0339358 A1* | 12/2013 | Huibers | G06F 17/30165 |
| | | | 707/737 |
| 2014/0156746 A1* | 6/2014 | Wheatley | H04L 67/22 |
| | | | 709/204 |
| 2015/0156610 A1* | 6/2015 | Eland | H04W 4/023 |
| | | | 455/456.3 |

FOREIGN PATENT DOCUMENTS

| | | |
|---|---|---|
| JP | 2005-10848 A | 1/2005 |
| JP | 2007-34754 A | 2/2007 |
| JP | 2007-267059 A | 10/2007 |
| JP | 2008-305320 A | 12/2008 |
| JP | 2011-39853 A | 2/2011 |
| JP | 2011-176739 A | 9/2011 |
| JP | 2012-141971 A | 7/2012 |
| KR | 10-0685131 B1 | 2/2007 |
| KR | 10-2010-0122977 A | 11/2010 |
| KR | 10-2011-0042835 A | 4/2011 |
| KR | 10-2011-0048126 A | 5/2011 |
| KR | 10-2012-0001562 A | 1/2012 |
| KR | 10-2012-0014480 A | 2/2012 |
| RU | 2451986 C2 | 5/2012 |

OTHER PUBLICATIONS

Written Opinion dated Dec. 16, 2013 issued in International Application No. PCT/KR2013/007577 (PCT/ISA/237).
Communication dated Feb. 24, 2014 issued by the European Patent Office in counterpart European Patent Application No. 13181604.3.
Communication dated Jun. 6, 2016, issued by the Federal Service for Intellectual Property in counterpart Russian Patent Application No. 2015110324.
Communication dated Feb. 15, 2017, issued by the European Patent Office in counterpart European Application No. 13181604.3.
S.J. Shepherd et al., "Concepts and architectures for next-generation information search engines", International Journal of Information Management, Elsevier Science Ltd, GB, vol. 27, No. 1, Feb. 20, 2007, pp. 3-8, XP005896228, DOI: 10.1016/J.IJINFOMGT.2006. 06.005.
Communication dated Nov. 16, 2017, from the State Intellectual Property Office of People's Republic of China in counterpart Application No. 201310376228.6.
Communication dated Oct. 2, 2017, from the Japanese Patent Office in counterpart application No. 2013-173665.
Communication dated Feb. 5, 2018, issued by the Japanese Patent Office in counterpart Japanese application No. 2013-173665.
Second Office Action dated Jun. 13, 2018 issued by the Chinese Patent Office in counterpart Chinese Patent Application No. 201310376228.6.

* cited by examiner

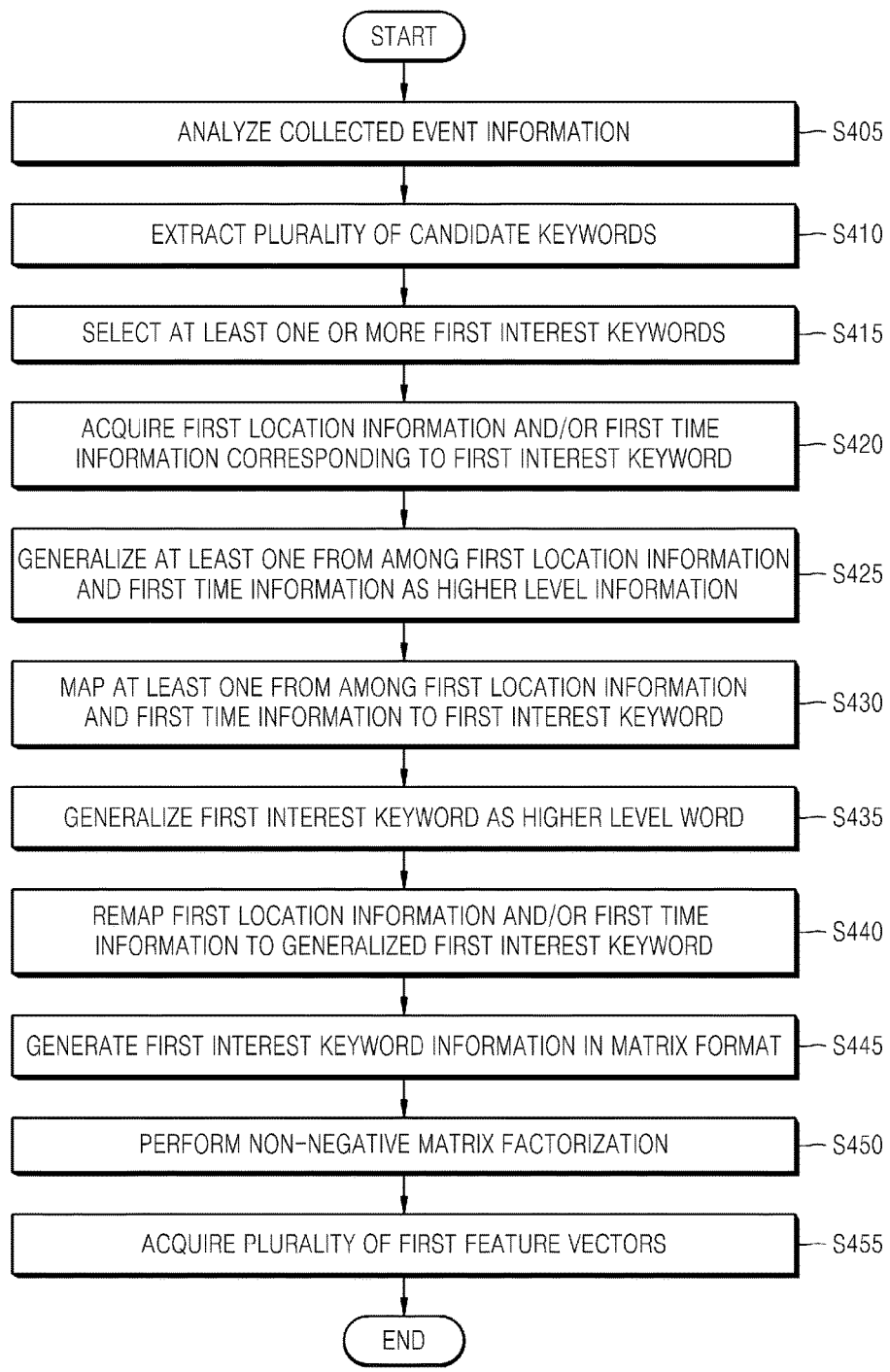

FIG. 7

| Location x Time | Keyword 1 | Keyword 2 | Keyword 3 | Keyword 4 | ... | Keyword N |
|---|---|---|---|---|---|---|
| SUWON CITY x MORNING | 10 | | | | | |
| SUWON CITY x NOON | | 4 | 23 | | | 10 |
| SUWON CITY x AFTERNOON | | | | | | |
| SUWON CITY x DAWN | 1 | | | | | |
| SEOUL CITY x MORNING | | | | 7 | | 1 |
| SEOUL CITY x NOON | | | | | | |
| SEOUL CITY x AFTERNOON | | 1 | 2 | | | 6 |
| SEOUL CITY x EVENING | 5 | | | | | |
| ... | | | | | | |

M entries

N Actions (Keywords)

M x N Sparse Keywords Matrix

FIG. 8

$$M \begin{bmatrix} & N & \\ & M \times N & \\ & \text{Sparse Keywords Matrix} & \end{bmatrix} = M \begin{bmatrix} K \\ M \times K \\ \text{Feature} \\ \text{Vector} \end{bmatrix} \times K \begin{bmatrix} & N & \\ & K \times N & \\ & \text{Feature} & \\ & \text{Vector} & \end{bmatrix}$$

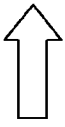
FIG. 17A / FIG. 17B

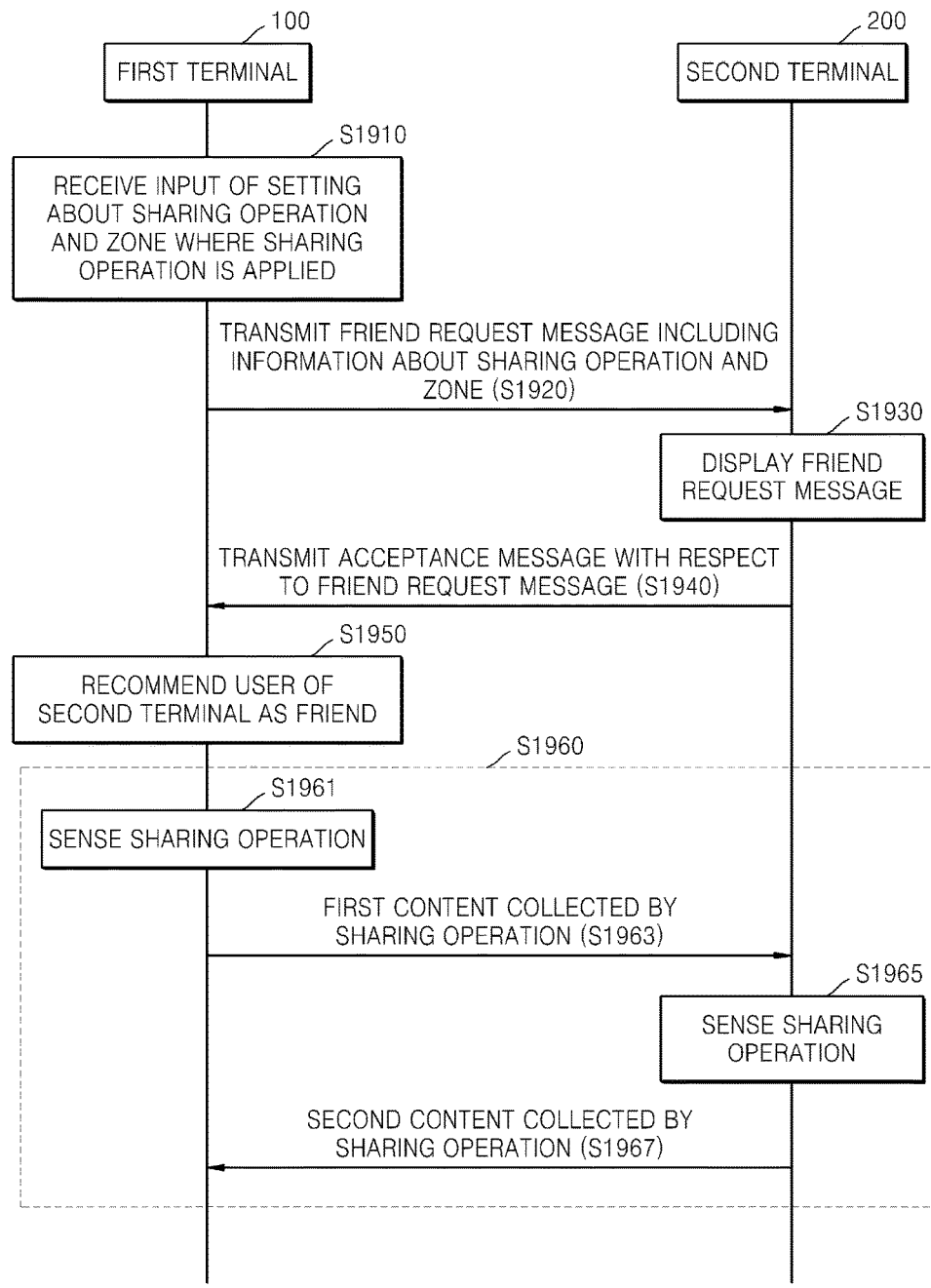

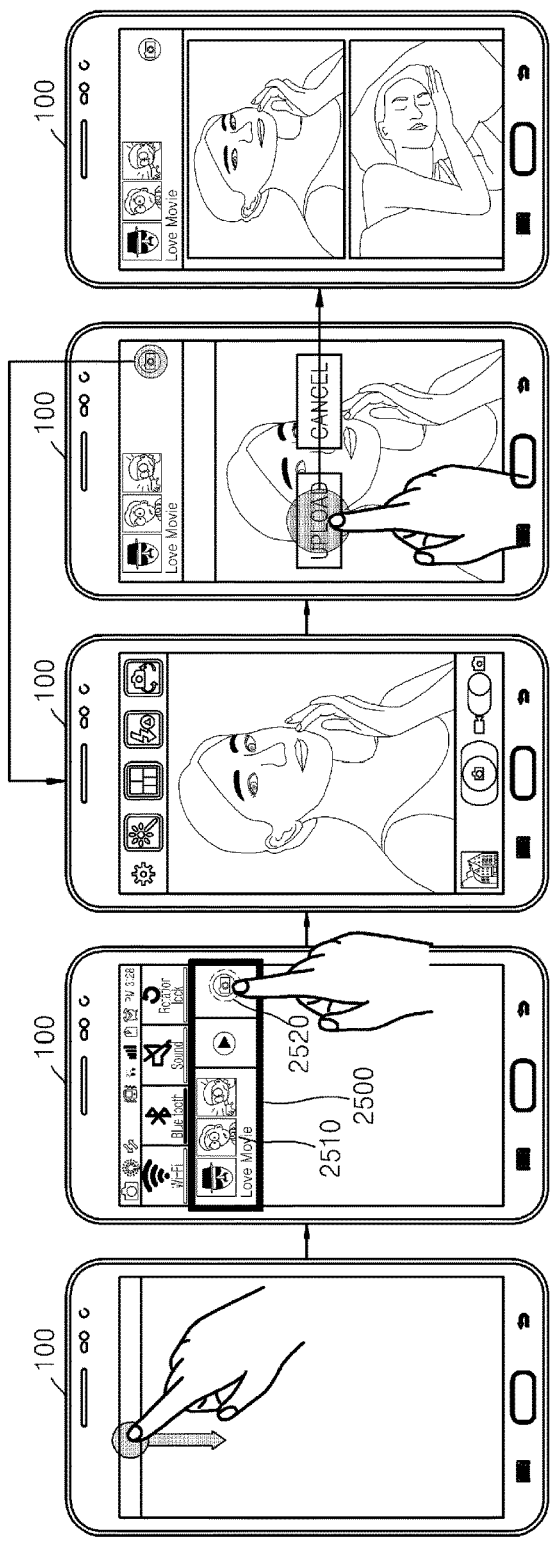

METHOD OF RECOMMENDING FRIENDS, AND SERVER AND TERMINAL THEREFOR

CROSS-REFERENCE TO RELATED PATENT APPLICATION

This application claims the priority from Korean Patent Application Nos. 10-2012-0093254, filed on Aug. 24, 2012, and 10-2013-0046927, filed on Apr. 26, 2013, in the Korean Intellectual Property Office, the disclosures of which are incorporated herein in their entirety by reference.

BACKGROUND

1. Field

Exemplary embodiments relate to a method of recommending friends by comparing interest keywords information among a plurality of terminals, and a server and terminal therefor.

2. Description of the Related Art

As the number of smartphone users increases, users of social networking services (SNS) also increase. An SNS is a service enabling a user to form a relationship with many unspecified people. SNS users form new personal relationships, or enhance relationships with existing connections. However, according to currently provided social networking services, personal information may be open to other unspecified people, and as a result, users may feel insecure. In addition, a user may inadvertently form relationships with other users that do not have much in common with user.

Therefore, an efficient friend recommendation system is necessary that allows users having a particular bond or common interest to form a relationship.

SUMMARY

Exemplary embodiments provide a method of recommending friends, which is capable of effectively recommending friends having common interests by recommending friends based on a similarity of interest keywords information between a plurality of terminals.

According to an aspect of an exemplary embodiment, a method of recommending a friend, in a first terminal is provided. The method includes: generating first interest keyword information by analyzing event information of the first terminal, receiving second interest keyword information of a second terminal, comparing the first interest keyword information and the second interest keyword information, and displaying information recommending a user of the second terminal as a friend based on a result of the comparing.

The method may also include: collecting the event information in the first terminal, wherein the collecting of the event information comprises collecting at least one from among location information of the first terminal, network information, user status information, sent/received message information, phone call history information, social networking service (SNS) usage information, application usage information, web page usage information, and payment information.

The generating the first interest keyword information may include selecting at least one first interest keyword by analyzing the event information, wherein the first interest keyword information may include the at least one first interest keyword and at least one from among first location information and first time information corresponding to the first interest keyword.

The selecting the at least one first interest keyword may include generalizing the event information into a higher level first interest keyword.

The generalizing the event information may include setting a generalization level for the generalizing the event information into a higher level first interest keyword.

The selecting the at least one first interest keyword may include extracting a plurality of candidate keywords by analyzing the event information and selecting the at least one first interest keyword from among the plurality of candidate keywords based on the number of times each of the plurality of candidate keywords is extracted.

The receiving of the second interest keyword information may include receiving second interest keyword information comprising a second interest keyword that is generalized as higher level information based on event information of the second terminal.

The second interest keyword information may also include at least one from among second location information and second time information mapped to the second interest keyword.

The receiving of the second interest keyword information from the second terminal may be performed through at least one from among a wireless local area network (LAN), a near field communication (NFC), Bluetooth, Zigbee, Wi-Fi Direct (WFD), and ultra wideband (WUB) communication.

The displaying the information recommending a user of the second terminal as a friend may include calculating a similarity between the first interest keyword information and the second interest keyword information based on the result of the comparing and displaying the information recommending the user of the seconder terminal as the friend if the similarity is a predetermined value or greater.

The method may further include deleting the second interest keyword information after a predetermined time has passed.

The method may also include receiving a command to perform a sharing operation for sharing content, receiving a selection of a zone to perform the sharing operation, and transmitting a friend request message including information about the sharing operation to the second terminal if the second interest keyword information indicates that the second terminal is located in the selected zone.

The method may also include receiving a friend acceptance message from the second terminal in response to the transmitting the friend request message; and sharing content collected by the sharing operation with the second terminal in response to receiving the friend acceptance message.

The sharing of the content may include transmitting first content shared by the first terminal to the second terminal; and receiving second content shared by the second terminal, from the second terminal.

According to an aspect of another exemplary embodiment, a first terminal for recommending a friend is provided. The first terminal includes a display, a communication unit, and a controller which is configured to control the communication unit to receive second interest keyword information of a second terminal, generate first interest keyword information by analyzing event information of the first terminal, compare the first interest keyword information and the second interest keyword information, and control the display to display information recommending a user of the second terminal as a friend based on a result of the comparing.

The controller may be further configured to collect the event information in the first terminal, and the event information comprises at least one from among location information of the first terminal, network information, user status information, sent/received message information, phone call history information, social networking service (SNS) usage information, application usage information, web page usage information, and payment information.

The controller may also be configured to analyze the event information to select at least one first interest keyword. The first interest keyword information may include the at least one first interest keyword and at least one from among first location information and first time information corresponding to the first interest keyword.

The controller may also be configured to select the at least one first interest keyword by generalizing the event information into a higher level first interest keyword.

The controller may also be configured to set a generalization level for the generalizing the event information into the higher level first interest keyword.

The controller may also be configured to select the at least one first interest keyword by extracting a plurality of candidate keywords from the analyzed the event information, and select the at least one first interest keyword from among the plurality of candidate keywords based on the number of times each of the plurality of candidate keywords are extracted.

The controller may also be configured to control the communication unit to receive second interest keyword information including a second interest keyword that is generalized as higher level information based on event information of the second terminal.

The second interest keyword information may also include at least one from among second location information and second time information mapped to the second interest keyword.

The communication unit may be configured to communicate with the second terminal through at least one from among a wireless local area network (LAN), a near field communication (NFC), Bluetooth, Zigbee, Wi-Fi Direct (WFD), and ultra wideband (WUB) communication.

The controller may also be configured to calculate a similarity between the first interest keyword information and the second interest keyword information based on the result of the comparing, and control the display to display information recommending the user of the second terminal as the friend if the calculated similarity is a predetermined value or greater.

The controller may also be configured to delete the second interest keyword information after a predetermined time has passed.

The controller may also be configured to receive a command to perform a sharing operation for sharing content, receive a selection of a zone to perform the sharing operation, and control the communication unit to transmit a friend request message including information about the sharing operation to the second terminal if the second interest keyword information indicates that the second terminal is located in the selected zone.

The controller may also be further configured to control the communication unit to receive a friend acceptance message from the second terminal in response to the transmission of the friend request message and share content with the second terminal in response to the receipt of the friend acceptance message.

The controller may also be configured to control the communication unit to transmit first content collected by the first terminal to the second terminal and receive second content collected by the second terminal, from the second terminal.

According to an aspect of another exemplary embodiment, a method of recommending friends, in a friend recommendation server, is provided. The method includes: receiving, from a first terminal, first interest keyword information comprising a first keyword mapped to at least one from among time information and location information, receiving, from a second terminal, second interest keyword information comprising a second keyword mapped to at least one from among second time information and second location information, comparing the first interest keyword information and the second interest keyword information with each other; and providing at least one from among the first terminal and the second terminal with friend recommendation information based on a result of the comparing.

According to an aspect of another exemplary embodiment, there is provided a method of recommending a friend, in a first terminal, the method including: collecting event information in the first terminal; acquiring first interest keyword information by analyzing the collected event information; receiving second interest keyword information that is acquired by analyzing event information in a second terminal, from the second terminal; comparing the first interest keyword information and the second interest keyword information with each other; and recommending a user of the second terminal as a friend based on a result of the comparing.

The collecting of the event information may include collecting at least one from among location information of the first terminal, network information, user status information, sent/received message information, phone call history information, social networking service (SNS) usage information, application usage information, web page usage information, and payment information.

The acquiring of the first interest keyword information may include selecting at least one first interest keyword by analyzing the event information, and the first interest keyword information may include at least one from among first location information and first time information corresponding to the first interest keyword. The acquiring of the first interest keyword information may include generalizing at least one from among the first location information and the first time information as higher level information.

The method may further include setting a generalization level for generalizing the at least one from among the first location information and the first time information as higher level information.

The selecting of the first interest keyword may include: extracting a plurality of candidate keywords by analyzing the event information; and selecting the first interest keyword from among the plurality of candidate keywords based on the number of times each of the candidate keywords are extracted.

The extracting of the plurality of candidate keywords may include analyzing the event information by using a natural language processing (NLP) technology.

The acquiring of the first interest keyword information may include: generalizing the first interest keyword as a higher level word based on WordNet, which is a hierarchical lexical database; and mapping at least one from among the first location information and the first time information to the generalized first interest keyword.

The acquiring of the first interest keyword information may include generating the first interest keyword information to be in an extraction frequency matrix format about the generalized first interest keyword, by setting the generalized first interest keyword as a first axis and at least one from among the first location information and the first time information as a second axis.

The acquiring of the first interest keyword information may further include acquiring a plurality of first feature vectors about the first interest keyword information by performing non-negative matrix factorization on the first interest keyword information generated in the extraction frequency matrix format.

The receiving of the second interest keyword information may include receiving second interest keyword information that is generalized as higher level information after receiving an input of a generalization level in the second terminal.

The receiving of the second interest keyword information may include receiving the second interest keyword information, in which at least one from among second location information and second time information is mapped to the second interest keyword that is generalized as a higher level word.

The receiving of the second interest keyword information may include receiving the second interest keyword information generated in an extraction frequency matrix format about the second interest keyword that is generalized as the higher level word, by setting the generalized second interest keyword as a first axis and at least one from among the second location information and the second time information as a second axis.

The receiving of the second interest keyword information may include receiving a plurality of second feature vectors that are generated by performing non-negative matrix factorization on the second interest keyword information that is generated in the extraction frequency matrix format.

The receiving of the second interest keyword information from the second terminal may be performed through one of a wireless local area network (LAN), a near field communication (NFC), Bluetooth, Zigbee, Wi-Fi Direct (WFD), and ultra wideband (WUB) communication.

The first interest keyword information about the first interest keyword that is generalized as a higher level word and the second interest keyword information about the second interest keyword that is generalized as a higher level word may be compared with each other.

The comparing may include comparing a plurality of first feature vectors that are generated through non-negative matrix factorization of the first interest keyword information and a plurality of second feature vectors that are generated through non-negative matrix factorization of the second interest keyword information.

The recommending of the friend may include: calculating a similarity between the first interest keyword information and the second interest keyword information based on the result of the comparing; and when the calculated similarity is a predetermined value or greater, recommending a user of the second terminal as a friend.

The method may further include deleting the second interest keyword information after a predetermined time has passed.

The collecting of the event information in the first terminal may include: receiving a setting about a sharing operation for sharing content; and transmitting a friend request message including information about the sharing operation to the second terminal, wherein the receiving of the second interest keyword information may include receiving an acceptance message corresponding to the friend request message from the second terminal, and the recommending of the friend may include recommending the user of the second terminal that transmits the acceptance message as a friend.

The method may further include: sensing the sharing operation; and sharing content collected by the sharing operation with the second terminal.

The sharing of the content may include: transmitting a first content collected by the sharing operation in the first terminal to the second terminal; and receiving a second content collected by the sharing operation in the second terminal, from the second terminal.

The sharing of the content may include sharing the content collected by the sharing operation with the second terminal via a sharing server.

The receiving of the setting about the sharing operation may include receiving a setting about a zone where the sharing operation is applied.

The method may further include: sensing the sharing operation in the zone; and sharing the content collected by the sharing operation with the second terminal.

The method may further include: sensing a user gesture for requesting a sharing panel; and displaying at least one from among information about the sharing operation, applications relating to the sharing operation, and information about at least one friend connected by the sharing operation on the sharing panel, in response to the user gesture.

According to an aspect of another exemplary embodiment, there is provided a method of recommending friends, in a friend recommendation server, the method including: receiving first interest keyword information that is acquired based on event information collected by a first terminal, from the first terminal; receiving second interest keyword information that is acquired based on event information collected by a second terminal, from the second terminal; comparing the first interest keyword information and the second interest keyword information with each other; and providing at least one from among the first terminal and the second terminal with friend recommendation information based on a result of the comparing.

The event information may include at least one from among location information of the first terminal, network information, user status information, sent/received message information, phone call history information, social networking service (SNS) usage information, application usage information, web page usage information, and payment information.

The first interest keyword information may include information about a first interest keyword to which at least one from among first location information and first time information is mapped, and the second interest keyword information may include information about a second interest keyword to which at least one from among second location information and first time information is mapped.

At least one from among the first location information, the first time information, the second location information, and the second time information may be generalized as higher level information.

The first interest keyword information may include information about a first interest keyword that is generalized as a higher level word based on WordNet (hierarchical lexical database), and the second interest keyword information may include information about a second interest keyword that is generalized as a higher level word based on the WordNet.

The method may include receiving the first interest keyword information in an extraction frequency matrix format about the generalized first interest keyword, generated by setting the generalized first interest keyword as a first axis and at least one from among the first location information and the first time information as a second axis, and receiving the second interest keyword information in an extraction frequency matrix format about the generalized second interest keyword, generated by setting the generalized second interest keyword as a first axis and at least one from among the second location information and the second time information as a second axis.

The method may include receiving a plurality of first feature vectors about the first interest keyword information by performing non-negative matrix factorization on the first interest keyword information generated in the extraction frequency matrix format, and receiving a plurality of second feature vectors about the second interest keyword information by performing non-negative matrix factorization on the second interest keyword information generated in the extraction frequency matrix format.

The method may include comparing the first interest keyword information about a first interest keyword that is generalized as a higher level word and the second interest keyword information about a second interest keyword that is generalized as a higher level word.

The method may include comparing a plurality of first feature vectors that are generated through non-negative matrix factorization of the first interest keyword information and a plurality of second feature vectors that are generated through non-negative matrix factorization of the second interest keyword information.

The method may include calculating a similarity between the first interest keyword information and the second interest keyword information based on the result of the comparing; and when the calculated similarity is a predetermined value or greater, providing at least one from among the first terminal and the second terminal with friend recommendation information.

The method may further include providing at least one from among the first terminal and the second terminal in further consideration of locations of the first terminal and the second terminal.

The method may further include deleting the first interest keyword information and the second interest keyword information after a predetermined time has passed.

The method may include receiving the first interest keyword information and the second interest keyword information for a predetermined time from the first terminal and the second terminal located at predetermined locations.

According to an aspect of another exemplary embodiment, there is provided a first terminal for recommending a friend, the first terminal including: an event information collection unit for collecting event information about events occurring in the first terminal; an interest keyword information manager for acquiring first interest keyword information by analyzing the collected event information; a communication unit for receiving second interest keyword information that is acquired by analyzing event information in a second terminal, from the second terminal; a recommendation unit for comparing the first interest keyword information and the second interest keyword information with each other, and recommending a user of the second terminal as a friend based on a result of the comparing; and a controller for controlling the event information collection unit, the interest keyword information manager, the communication unit, and the recommendation unit.

The event information collection unit may collect at least one from among location information of the first terminal, network information, user status information, sent/received message information, phone call history information, social networking service (SNS) usage information, application usage information, web page usage information, and payment information.

The interest keyword information manager may select at least one first interest keyword by analyzing the event information, and the first interest keyword information may include at least one from among first location information and first time information corresponding to the first interest keyword.

The interest keyword information manager may generalize at least one from among the first location information and the first time information as higher level information. The controller may set a generalization level for generalizing the at least one from among the first location information and the first time information as higher level information.

The interest keyword information manager may extract a plurality of candidate keywords by analyzing the event information, and may select the first interest keyword from among the plurality of candidate keywords based on the number of times each of the candidate keywords are extracted.

The interest keyword information manager may extract the plurality of candidate keywords by analyzing the event information by using a natural language processing (NLP) technology.

The interest keyword information manager may generalize the first interest keyword as a higher level word based on WordNet, which is a hierarchical lexical database, and may map at least one from among the first location information and the first time information to the generalized first interest keyword.

The interest keyword information manager may generate the first interest keyword information to be in an extraction frequency matrix format about the generalized first interest keyword, by setting the generalized first interest keyword as a first axis and at least one from among the first location information and the first time information as a second axis.

The interest keyword information manager may acquire a plurality of first feature vectors about the first interest keyword information by performing non-negative matrix factorization on the first interest keyword information generated in the extraction frequency matrix format.

The communication unit may receive second interest keyword information that is generalized as higher level information after receiving an input of a generalization level in the second terminal.

The communication unit may receive the second interest keyword information, in which at least one from among second location information and second time information may be mapped to the second interest keyword that is generalized as a higher level word.

The communication unit may receive the second interest keyword information generated to be in an extraction frequency matrix format about the second interest keyword that is generalized as the higher level word, by setting the generalized second interest keyword as a first axis and at least one from among the second location information and the second time information as a second axis.

The communication unit may receive a plurality of second feature vectors that are generated by performing non-negative matrix factorization on the second interest keyword information that is generated in the extraction frequency matrix format.

The communication unit may receive from the second terminal the second interest keyword information from the second terminal through at least one from among a wireless local area network (LAN), a near field communication (NFC), Bluetooth, Zigbee, Wi-Fi Direct (WFD), and ultra wideband (WUB) communication.

The recommendation unit may compare the first interest keyword information about the first interest keyword that is generalized as a higher level word and the second interest keyword information about the second interest keyword that is generalized as a higher level word.

The recommendation unit may compare a plurality of first feature vectors that are generated through non-negative matrix factorization of the first interest keyword information and a plurality of second feature vectors that are generated through non-negative matrix factorization of the second interest keyword information.

The recommendation unit may calculate a similarity between the first interest keyword information and the second interest keyword information based on the result of the comparing, and when the calculated similarity is a predetermined value or greater, may recommend a user of the second terminal as a friend.

The controller may delete the second interest keyword information after a predetermined time has passed.

The event information collection unit may receive a setting about a sharing operation for sharing content, the communication unit may transmit a friend request message including information about the sharing operation to the second terminal and receives an acceptance message corresponding to the friend request message from the second terminal, and the recommendation unit may recommend the user of the second terminal that transmits the acceptance message as a friend.

The event information collection unit may sense the sharing operation, and may share content collected by the sharing operation with the second terminal.

The communication unit may transmit a first content collected by the sharing operation in the first terminal to the second terminal, and may receive a second content collected by the sharing operation in the second terminal, from the second terminal.

The communication unit may share the content collected by the sharing operation with the second terminal via a sharing server.

The event information collection unit may further receive a setting about a zone where the sharing operation is applied.

The event information collection unit may sense the sharing operation in the zone, and may share the content collected by the sharing operation with the second terminal.

The event information collection unit may sense a user gesture for requesting a sharing panel, and the controller may display at least one from among information about the sharing operation, applications relating to the sharing operation, and information about at least one friend connected by the sharing operation on the sharing panel, in response to the user gesture.

According to an aspect of another exemplary embodiment, there is provided a friend recommendation server including a communication unit receiving first interest keyword information that is acquired based on event information collected by a first terminal, from the first terminal and receiving second interest keyword information that is acquired based on event information collected by a second terminal, from the second terminal; a recommendation unit comparing the first interest keyword information and the second interest keyword information with each other and providing at least one from among the first terminal and the second terminal with friend recommendation information based on a result of the comparing; and a controller for controlling the communication unit and the recommendation unit.

The communication unit may receive the first interest keyword information in an extraction frequency matrix format about the generalized first interest keyword, generated by setting the generalized first interest keyword as a first axis and at least one from among the first location information and the first time information as a second axis, and may receive the second interest keyword information in an extraction frequency matrix format about the generalized second interest keyword, generated by setting the generalized second interest keyword as a first axis and at least one from among the second location information and the second time information as a second axis.

The communication unit may receive a plurality of first feature vectors about the first interest keyword information by performing non-negative matrix factorization on the first interest keyword information generated in the extraction frequency matrix format, and may receive a plurality of second feature vectors about the second interest keyword information by performing non-negative matrix factorization on the second interest keyword information generated in the extraction frequency matrix format.

The recommendation unit may compare the first interest keyword information about a first interest keyword that is generalized as a higher level word and the second interest keyword information about a second interest keyword that is generalized as a higher level word.

The recommendation unit may compare a plurality of first feature vectors that are generated through non-negative matrix factorization of the first interest keyword information and a plurality of second feature vectors that are generated through non-negative matrix factorization of the second interest keyword information. The recommendation unit may calculate a similarity between the first interest keyword information and the second interest keyword information based on the result of the comparing; and when the calculated similarity is a predetermined value or greater, may provide at least one from among the first terminal and the second terminal with friend recommendation information.

The recommendation unit may provide at least one from among the first terminal and the second terminal in further consideration of locations of the first terminal and the second terminal.

The controller may delete the first interest keyword information and the second interest keyword information after a predetermined time has passed.

The communication unit may receive the first interest keyword information and the second interest keyword information for a predetermined time from the first terminal and the second terminal located at predetermined locations.

BRIEF DESCRIPTION OF THE DRAWINGS

The above and other features and advantages more apparent by describing in detail exemplary embodiments with reference to the attached drawings in which:

FIG. 4 is a flowchart illustrating a method of acquiring first interest keyword information by the first terminal, according to an exemplary embodiment;

FIG. 7 is a diagram showing an extraction frequency matrix of the first interest keyword according to an exemplary embodiment;

FIG. 8 is a diagram showing a non-negative matrix factorization (NMF) result of the extraction frequency matrix about the first interest keyword, according to an exemplary embodiment;

FIGS. 17A and 17B are diagrams showing a friend recommendation screen displayed through a travel application in the first terminal according to an exemplary embodiment;

FIG. 19 is a flowchart illustrating a method of recommending a friend by using a sharing operation, according to an aspect of another exemplary embodiment;

FIGS. 25A through 25E are diagrams illustrating a method of sharing content through a sharing panel, according to an exemplary embodiment.

DETAILED DESCRIPTION OF EXEMPLARY EMBODIMENTS

Terms used herein will be briefly described, and exemplary embodiments will be described in detail below.

General and widely-used terms have been employed herein, in consideration of functions provided in exemplary embodiments, and may vary according to an intention of one of ordinary skill in the art, a precedent, or emergence of new technologies. Additionally, in some cases, an applicant may arbitrarily select specific terms, in which case, the applicant will provide the meaning of the terms in the description of exemplary embodiments Accordingly, It will be understood that the terms used herein should be interpreted as having a meaning that is consistent with their meaning in the context of the relevant art and will not be interpreted in an idealized or overly formal sense unless expressly so defined herein.

It will be further understood that the terms "comprises," "comprising," "includes," and/or "including," when used herein, specify the presence of components, but do not preclude the presence or addition of one or more other components, unless otherwise specified. Additionally, terms used herein, such as 'unit' or 'module', mean entities for processing at least one function or operation. These entities may be implemented by hardware, software, or a combination of hardware and software.

Exemplary embodiments will now be described more fully with reference to the accompanying drawings. The exemplary embodiments may, however, be embodied in many different forms and should not be construed as being limited to the exemplary embodiments set forth herein. In the description of exemplary embodiments, certain detailed explanations are omitted when it is deemed that they may unnecessarily obscure the essence of the exemplary embodiments. Like numbers refer to like elements throughout the description of the figures. As used herein, the term "and/or" includes any and all combinations of one or more of the associated listed items. Expressions such as "at least one of," when preceding a list of elements, modify the entire list of elements and do not modify the individual elements of the list.

Figure 1:
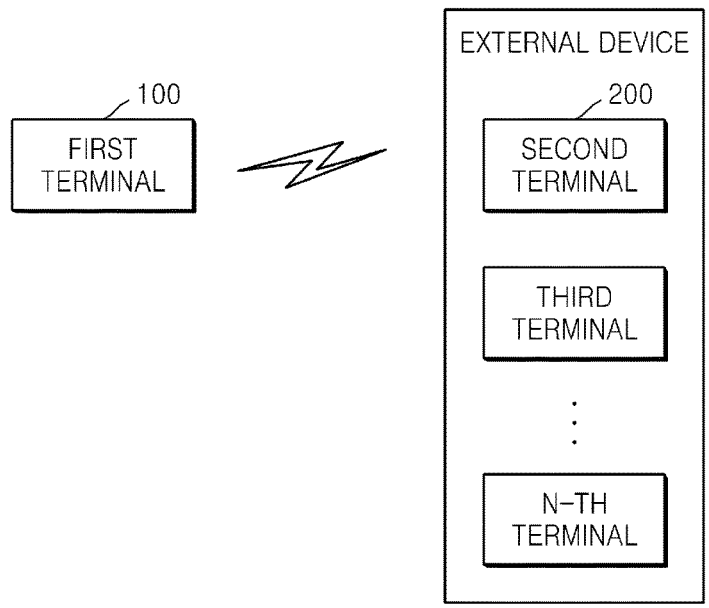
FIG. 1 is a block diagram of a friend recommending system according to an exemplary embodiment.

FIG. 1 is a diagram showing a friend recommending system according to an exemplary embodiment.

As shown in FIG. 1, the friend recommending system according to an exemplary embodiment may include a plurality of terminals, for example, a first terminal 100, a second terminal 200, a third terminal, . . . , and an N-th terminal.

The first terminal 100, the second terminal 200, the third terminal, . . . , and the N-th terminal according to an exemplary embodiment may transmit/receive information about interest keywords to and/or from each other, and may compare their own interest keyword information with interest keyword information of a counterpart to recommend a user of the counterpart terminal as a friend.

Hereinafter, a method of recommending friends, in the first terminal 100 from among the plurality of terminals, will be described as an example. The method of recommending friends, in the first terminal 100, according to an exemplary embodiment may be applied to the other terminals. For convenience of description, the second terminal 200 will be described as a representative terminal of an external device.

The first terminal 100 and the second terminal 200 according to an exemplary embodiment may be implemented as various types of terminals. For example, the first terminal 100 and the second terminal 200 may be mobile phones, smartphones, laptop computers, computers, tablet PCs, electronic book terminals, smart televisions (TVs), digital broadcasting terminals, personal digital assistants (PDAs), portable multimedia players (PMPs), and navigation devices; however, the exemplary embodiments are not limited thereto.

Hereinafter, configurations of the first terminal 100 will be described in more detail with reference to FIG. 2.

Figure 2:
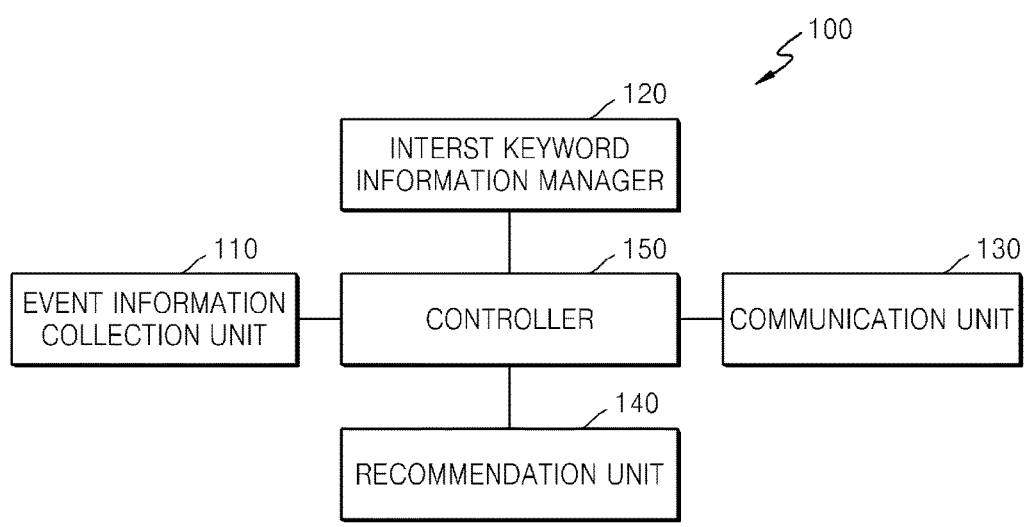
FIG. 2 is a block diagram of a first terminal according to an exemplary embodiment.

FIG. 2 is a block diagram showing the first terminal 100 according to an exemplary embodiment.

As shown in FIG. 2, the first terminal 100 may include an event information collection unit 110, an interest keyword information manager 120, a communication unit 130, a recommendation unit 140, and a controller 150. However, the first terminal 100 may include more components than those of FIG. 2, or less components than those of FIG. 2.

Hereinafter, the above components will be described in detail.

The event information collection unit 110 senses various kinds of events occurring in the first terminal 100, and may collect information about the various kinds of events that are sensed.

The event information collection unit 110 according to an exemplary embodiment may include various sensors for collecting the event information. For example, the event information collection unit 110 may include an acceleration sensor, a tilt sensor, a gyro sensor, a 3-axis magnetic sensor, a voice recognition sensor, an illuminance sensor, a temperature sensor, an image sensor (for example, a camera), and a touch sensor.

The event information collection unit 110 of an exemplary embodiment may collect location information or network information of the first terminal 100. For example, the event information collection unit 110 may collect global positioning system (GPS) coordinate information, Cell-ID information, Wi-Fi access point (AP) information, etc.

The event information collection unit 110 of an exemplary embodiment may collect status information of a user. The status information of the user is information about movements of the user or activity patterns of the user, that is, information about a walking status of the user, a workout status of the user, a driving status of the user, a sleeping status of the user, etc. For example, if the user connects the first terminal to a stand in his/her house, the event information collection unit 110 may determine that the user is in the sleeping status in consideration of location information, tilt information, movement information, current time information, and alarm setting information of the first terminal 100. In addition, if the user connects the first terminal 100 to a holder in his/her car, the event information collection unit 110 may determine that the user is in the driving status in consideration of location information, tilt information, and movement information of the first terminal 100.

The event information collection unit 110 according to an exemplary embodiment may collect contents input from a user input unit. For example, the event information collection unit 110 may collect information such as text, drawings, and signs input from the user via a touch screen, or may recognize a voice of the user and collect the content input from the voice of the user.

The event information collection unit 110 according to an exemplary embodiment may collect sent/received message information, sent/received e-mail information, calling list information, social networking service (SNS) usage information, and web page usage information. For example, the event information collection unit 110 may collect sent/received time of a message or an e-mail, contents in the sent/received message or e-mail, calling content, calling time, counterpart information, time of accessing an SNS server, SNS usage list, information received from the SNS server, time of accessing a web page, and web page usage list.

The event information collection unit 110 according to an exemplary embodiment may collect information about application usage in the first terminal 100. For example, if the user keeps household accounts after executing an account book application, the event information collection unit 110 may collect information about expenditure, income, and investment recorded in the account book. In addition, if the user inputs his/her scheduling information after executing a schedule management application, the event information collection unit 110 may collect schedule information of the user. Further, the event information collection unit 110 may also collect information about captured contents that are captured by the user after executing a capture application, or may collect information about music selected by the user through a music application.

The event information collection unit 110 may collect information such as identification information of an application that is installed or searched for by the user, information about a kind of the application, time when the application is used, and usage period of the application. In addition, if the user makes a payment by using a mobile card in the first terminal 100, the event information collection unit 110 may collect payment information of the user, and consumption pattern information of the user.

That is, the event information collection unit 110 of an exemplary embodiment may collect the information about the event occurring in the first terminal 100 and information about the user of the first terminal 100 by using various sensors. Here, the event information collection unit 110 of an exemplary embodiment may collect the event information at predetermined periods, or may collect the event information in real-time when the event occurs.

The event information collection unit 110 of an exemplary embodiment may receive settings about a sharing operation for sharing contents. The sharing operation according to an exemplary embodiment may vary. For example, the sharing operation may include a photographing operation, a voice recording operation, a music playing operation, a screen capturing operation, etc.; however, exemplary embodiments are not limited thereto.

The event information collection unit 110 may further receive settings about a zone where the sharing operation is applied. The zone where the sharing operation is applied according to an exemplary embodiment may be a communication range of the first terminal 100, region, distance or a predetermined point, or a building or a space set, by the user; however, exemplary embodiments are not limited thereto.

According to an exemplary embodiment, the event information collection unit 110 may sense a sharing operation. In addition, the event information collection unit 110 may sense whether the first terminal 100 is located within the zone where the sharing operation is applied.

The event information collection unit 110 may sense a user gesture for requesting a sharing panel. The user gesture for requesting the sharing panel according to an exemplary embodiment may vary. For example, the user gesture for requesting the sharing panel may include a gesture of dragging or flicking from a side of the first terminal 100 to the other side, a gesture of selecting a predetermined button, or a gesture of tapping or double-tapping a predetermined region of a screen in the first terminal 100; however, the exemplary embodiments are not limited thereto.

The interest keyword information manager 120 may acquire first interest keyword information by analyzing the event information collected from the first terminal 100. The first interest keyword information of an exemplary embodiment is information about at least one or more interest keywords that are extracted a predetermined number of times or greater by analyzing the event information. The first interest keyword information of an exemplary embodiment may include a first interest keyword, first location information corresponding to the first interest keyword information, and first time information corresponding to the first interest keyword.

The first interest keyword according to an exemplary embodiment may be a keyword that is extracted a predetermined number of times from a plurality of candidate keywords (proper nouns) that are extracted from the event information by using a natural language processing (NLP) technology. That is, the first interest keyword may denote a keyword that is extracted from events frequently occurring in the first terminal 100. There may be a plurality of first interest keywords according to an exemplary embodiment.

The first location information corresponding to the first interest keyword according to an exemplary embodiment may be information about location where the event, from which the first interest keyword is extracted, occurs. In addition, the first time information corresponding to the first interest keyword according to an exemplary embodiment may be information about a time when the event, from which the first interest keyword is extracted, occurs.

For example, when the user of the first terminal 100 sends a message "Do you want to go to the ballpark?" to a friend in a part A at 15:00, Feb. 15, 2012, the interest keyword information manager 120 may extract a first interest keyword, that is, ballpark, from the text message. Here, the location of the park A where the text message is sent is the first location information corresponding to the first interest keyword, and the time, that is, 15:00, Feb. 15, 2012, when the text message is sent, is the first time information corresponding to the first interest keyword.

That is, according to an exemplary embodiment, the interest keyword information manager 120 may generate the first interest keyword information by mapping at least one from among the first location information and the first time information to the first interest keyword.

If there are a plurality of events from which the first interest keyword is extracted and locations and times of the plurality of events are different from each other, the interest keyword information manager 120 analyzes the locations and the times where and when the plurality of events from which the first interest keyword is extracted occur, to set a location and a time having statistically high frequencies of occurrence as first location information and first time information, and may map the first location information and the first time information to the first interest keyword.

According to an exemplary embodiment, the interest keyword information manager 120 may generalize at least one from among the first location information and the first time information as higher level information, and may map the higher level information to the first interest keyword. In addition, the interest keyword information manager 120 may generalize the first interest keyword as a higher level word based on WordNet (a hierarchical lexical database), and may remap at least one from among the first location information and the first time information to the generalized first interest keyword.

WordNet is a database that builds correlations between words by using information about semantics and usage patterns of words. A basic structure of the WordNet includes logical groups called synsets, each containing a group of synonymous words, and semantic relations defining relations between the synsets. The semantic relations may include hypernyms, hyponyms, meronyms, and holonyms. In a noun section of the WordNet, an entity is the highest word that is expanded according to semantics to form lower level words. Therefore, the WordNet may be a kind of ontology in which conceptual words are classified and defined to form a hierarchical structure.

An ontology is a formal and explicit specification of a shared conceptualization. The ontology may be interpreted as a kind of dictionary including words and relations, in which words relating to a certain domain are represented hierarchically and inference rules for expanding the words additionally are included.

According to another exemplary embodiment, the interest keyword information manager 120 may extract a higher level word of a noun that is extracted by using the NLP technology as a candidate keyword. In this case, the first interest keyword may be keywords of predetermined generalized levels. For example, if nouns such as dog, cat, hamster, guinea pig, baseball, basketball, soccer, sports car, SUV, Volkswagen, Blue Marble, Monopoly, Catan, and Jenga are extracted through the event information analyzing, the first terminal 100 may extract a word 'pets' that is a higher level word of the dog, cat, hamster, and guinea pig, a word 'sports' that is a higher level word of baseball, basketball, and soccer, a word 'car' that is a higher level word of SUV, sports car, and Volkswagen, and a word 'board game' that is a higher level word of Blue Marble, Monopoly, Catan, and Jenga as candidate keywords. Here, if the number of extraction times of the candidate keyword 'pets' is 100, the number of extraction times of the candidate keyword 'sports' is 10, the number of the extraction times of the candidate keyword 'car' is 200, and the number of extraction times of the candidate keyword 'board game' is 70, the first terminal 100 may select the words 'car', 'pets', and 'board game' as the first interest word keywords based on the number of extraction times.

According to an exemplary embodiment, the interest keyword information manager 120 may configure the first interest keyword information as a matrix. For example, the interest keyword information manager 120 generates the first interest keyword information as an extraction frequency matrix with respect to the generalized first interest keyword, which includes the generalized first interest keyword as a first axis and at least one from among the first location information and the first time information as a second axis.

In addition, the interest keyword information manager 120 performs non-negative matrix factorization on the first interest keyword information generated as the extraction frequency matrix, to obtain a plurality of first feature vectors of the first interest keyword information.

The non-negative matrix factorization is a method of extracting partial information consisting of two matrices from a large amount of object information including non-negatives, and representing the object by using linear combinations of the two matrices. A first extracted matrix may represent partial information of the object, and a second extracted matrix may represent a weighed value of the partial information.

According to an exemplary embodiment, the interest keyword information manager 120 may be realized as a personalization server of the first terminal 100. This will be described in more detail later with reference to FIG. 9.

The communication unit 130 may include one or more components enabling communication with an external device and a network in which the external device is located. For example, the communication unit 130 may include a short distance communication module, a wireless internet module, a mobile communication module, and a location information module.

The short distance communication module is used when communicating within a short distance range and may be, for example, a Bluetooth, ultra wideband (UWB), Zigbee, near field communication (NFC), Wi-Fi direct (WFD), or infrared data association (IrDA) based module.

The wireless internet module is a module for wireless internet access, and may be embedded in or disposed outside the first terminal 100. The mobile communication module transmits/receives wireless signals to/from at least one from among a base station, an external device, and a server on a mobile communication network. The wired Internet module is a module for accessing Internet.

The location information module is a module for identifying or obtaining a location of the first terminal 100 and may be, for example, a GPS module. The GPS module receives location information from a plurality of satellites. Here, the location information may include coordinate information represented by latitude and longitude.

The communication unit 130 of an exemplary embodiment may transmit the first interest keyword information to the external device, and may receive interest keyword information from the external device. For example, the communication unit 130 of an exemplary embodiment may transmit the first interest keyword information to the second terminal 200, and may receive second interest keyword information from the second terminal 200. The second interest keyword information according to an exemplary embodiment may be information generated by the second terminal 200 based on event information collected by the second terminal 200.

The communication unit 130 of an exemplary embodiment may receive the second interest keyword information in a format, in which at least one from among second location information and second time information is mapped to a second interest keyword that is generalized as a higher level word. The second location information according to an exemplary embodiment is information about a location where an event, from which the second interest keyword is extracted, occurs, and the second time information is information about a time when the event, from which the second interest keyword is extracted, occurs.

The communication unit 130 may receive second interest keyword information as an extraction frequency matrix type about the second interest keyword that is generalized as the higher level word. For example, the communication unit 130 may receive the second interest keyword information of an extraction frequency matrix type of the second interest keyword that is generalized as the higher level word, wherein the matrix is formed by setting the second interest keyword that is generalized as the higher level word as a first axis and at least one from among the second location information and the second time information as a second axis.

The communication unit 130 according to an exemplary embodiment may receive a plurality of second feature vectors generated by performing non-negative matrix factorization on the second interest keyword information in the extraction frequency matrix form. Here, the communication unit 130 of an exemplary embodiment receives the second feature vectors from the second terminal 200, and transmits the first feature vectors to the second terminal 200 to reduce a data transmission amount.

The communication unit 130 according to an exemplary embodiment transmits a friend request message including information about a predetermined sharing operation to the second terminal 200, and may receive an acceptance message corresponding to the friend request message from the second terminal 200.

The communication unit 130 may share content collected by a predetermined sharing operation with the second terminal 200. For example, the communication unit 130 may transmit first content collected by a predetermined sharing operation in the first terminal 100 to the second terminal 200, and may receive second content collected by a predetermined sharing operation in the second terminal 200 from the second terminal 200.

In addition, the communication unit 130 may share the content collected by the sharing operation with the second terminal 200 via a shared server.

The recommendation unit 140 may compare the first interest keyword information with the second interest keyword information. According to an exemplary embodiment, the recommendation unit 140 may compare the first interest keyword information about the first interest keyword that is generalized as the higher level word and the second interest keyword information about the second interest keyword that is generalized as the higher level word with each other. The recommendation unit 140 may compare the plurality of the first feature vectors about the first interest keyword information and the plurality of the second feature vectors about the second interest keyword information with each other, wherein the first and second feature vectors are generated through the non-negative matrix factorization.

In addition, the recommendation unit 140 according to an exemplary embodiment may recommend the user of the second terminal 200 as a friend based on a result of comparing the first interest keyword information and the second interest keyword information.

That is, the recommendation unit 140 of an exemplary embodiment calculates a similarity between the first interest keyword information and the second interest keyword information, and may recommend the user of the second terminal 200 as a friend when the calculated similarity is equal to or greater than a predetermined value. For example, when the similarity between the first interest keyword information and the second interest keyword information is 80% or greater, the recommendation unit 140 may recommend the user of the second terminal 200 as a friend.

According to an exemplary embodiment, the recommendation unit 140 may calculate the similarity by calculating root-mean-square-error (RMSE) values of the first interest keyword information and the second interest keyword information.

According to an exemplary embodiment, the recommendation unit 140 may recommend the user of the second terminal 200 that transmits an acceptance message corresponding to the friend request message including at least one from among information about the sharing operation and information about the zone where the sharing operation is applied as a friend.

According to an exemplary embodiment, the first terminal 100 may recommend the user of the second terminal 200 as a friend while displaying information about the user of the second terminal 200 on a display unit (not shown).

The display unit (not shown) according to an exemplary embodiment may include at least one from among a liquid crystal display (LCD), a thin film transistor (TFT)-LCD, an organic light emitting diode (OLED), a flexible display, a 3-dimensional (3D) display, an electrophoretic display, and a transparent display. In addition, the first terminal 100 may include two or more display units (not shown) according to the type of the first terminal 100.

The controller 150 generally controls overall operations of the first terminal 100. That is, the controller 150 may control the event information collection unit 110, the interest keyword information manager 120, the communication unit 130, and the recommendation unit 140.

The controller 150 of an exemplary embodiment may set a generalization level for generalizing at least one from among the first interest keyword, the first location information, and the first time information as higher level information. The controller 150 may set the generalization level automatically, or based on a user input of the first terminal 100.

The controller 150 of an exemplary embodiment may delete the second interest keyword information from a memory (not shown) after a predetermined time period has passed, in order to protect personal information of the user of the second terminal 200.

The controller 150 of an exemplary embodiment may provide a sharing panel in response to a user gesture or input for requesting the sharing panel. Here, the controller 150 may display at least one from among information about a predetermined sharing operation, applications relating to the predetermined sharing operation, and information about at least one friend connected by the predetermined sharing operation on the sharing panel.

The first terminal 100 according to an exemplary embodiment may further include the memory (not shown). The memory (not shown) may store processing and controlling programs of the controller 150, or may store input/output data (for example, interest keyword information of an external device, WordNet information, etc.). The first terminal may also include a processor which is configured to execute the programs stored in the memory.

The memory (not shown) may include at least one type of storage medium from among a flash memory type, a hard disk type, a multimedia card micro type, a card type memory (for example, SD or XD memory), a random access memory (RAM), a static RAM (SRAM) a read only memory (ROM), an electrically erasable programmable ROM (EEPROM), a programmable ROM (PROM), a magnetic memory, a magnetic disk, and an optical disk. In addition, the first terminal 100 may have a web storage function performing as a memory (not shown) on the Internet.

Hereinafter, a method of recommending friends based on interest keyword information, by the first terminal 100, will be described in detail with reference to FIGS. 3 and 4.

Figure 3:
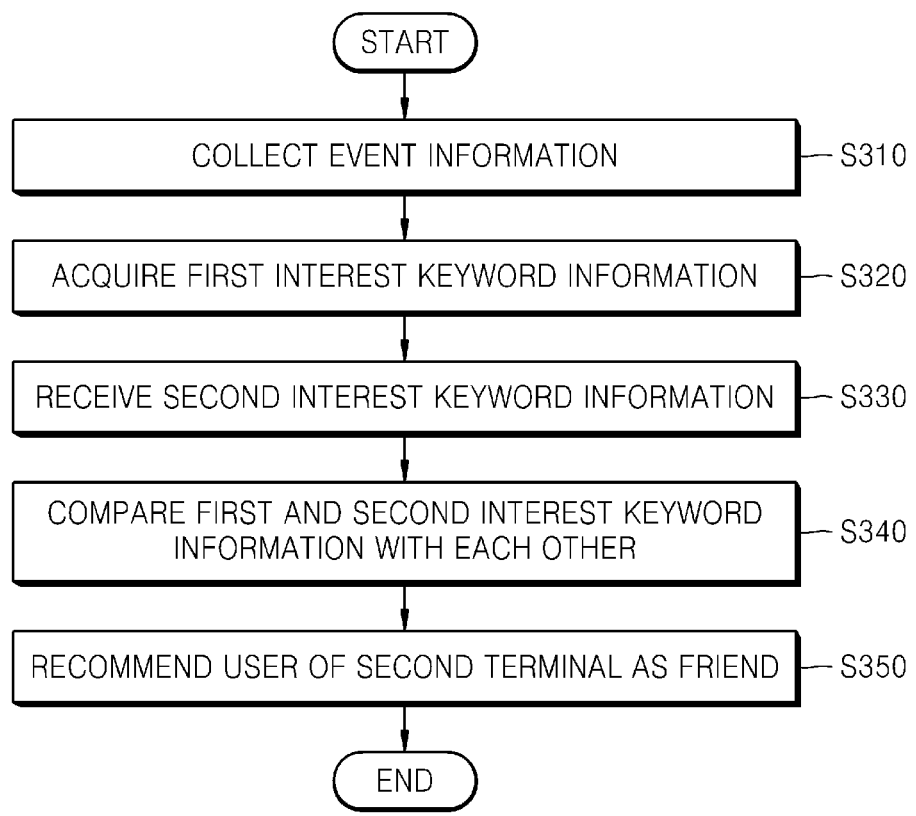
FIG. 3 is a flowchart illustrating a method of recommending friends, in the first terminal, according to an exemplary embodiment.

FIG. 3 is a flowchart illustrating a method of recommending friends by the first terminal 100 according to an exemplary embodiment.

Referring to FIG. 3, the method of recommending friends in the first terminal 100 according to an exemplary embodiment includes processes that are time-serially processed in the first terminal 100 shown in FIG. 2. Therefore, above descriptions about the first terminal 100 shown in FIG. 2 are also applied to the method of recommending friends illustrated in FIG. 3.

The first terminal 100 of an exemplary embodiment may collect information about an event occurring in the first terminal 100 (operation S310). For example, the first terminal 100 may collect location information, network information, user status information, sent/received message information, sent/received e-mail information, calling list information, SNS usage information, application usage information, web page usage information, and payment information of the first terminal 100.

The first terminal 100 may acquire the first interest keyword information by analyzing the collected event information (operation S320). That is, the first terminal 100 may recognize interests of the user by analyzing the location information, the network information, the user status information, the sent/received message information, the sent/received e-mail information, the calling list information, the SNS usage information, the application usage information, the web page usage information, and the payment information of the first terminal 100. For example, the first terminal 100 may recognize what kind of workout the user usually does in which place, what kind of music the user usually listens to before sleep, and which content is played while travelling by subway, by analyzing the location information, the network information, and the user status information of the first terminal 100. The first terminal 100 may recognize a hobby of the user (for example, golf, hiking, etc.), a field of interest of the user (for example, a stock market, a baseball team the user supports), and work content in the user's company, by using the sent/received message information, the sent/received e-mail information, the calling list information, and the SNS usage information. In addition, the first terminal 100 may extract information about, for example, a list of frequently used applications, a time when an application is used, and a period of use of the application, by using the application usage information. In addition, the first terminal 100 may recognize a consumption pattern of the user, a preference of the user, purchased goods, credit card information, and shops the user mainly uses, by analyzing the payment information.

The first terminal 100 may acquire the first interest keyword information based on the analyzed event information. For example, by analyzing the event information, if a keyword a is extracted 100 times, a keyword b is extracted 85 times, a keyword c is extracted 70 times, a keyword d is extracted 60 times, a keyword e is extracted 53 times, a keyword f is extracted 31 times, and a keyword g is extracted 10 times, the first terminal 100 may select the keywords a, b, c, d, and e as the first interest keywords based on the number of extracted times.

A large number of extracted times denotes that the interest of the user is high, and thus, the first terminal 100 of an exemplary embodiment selects the first interest keywords by reflecting the interest of the user.

The first terminal 100 may generate the first interest keyword information by mapping at least one from among the first location information and the first time information to the first interest keyword. Here, according to an exemplary embodiment, the first interest keyword, the first location information, and the first time information may be generalized as higher level information.

According to an exemplary embodiment, the first terminal 100 may generate the first interest keyword information as a matrix form. For example, the first terminal 100 may generate the first interest keyword information as an extraction frequency matrix about the first interest keyword by setting the first interest keyword as a first axis and at least one from among the first location information and the first time information as the second axis.

Here, according to an exemplary embodiment, the first terminal 100 may acquire a plurality of first feature vectors of the first interest keyword information by performing non-negative matrix factorization on the first interest keyword information that is generated in the extraction frequency matrix form.

The method of acquiring the first interest keyword information by the first terminal 100 will be described in more detail with reference to FIG. 4.

According to an exemplary embodiment, the first terminal 100 may receive the second interest keyword information from the second terminal 200 (operation S330). The first terminal 100 of an exemplary embodiment may receive the second interest keyword information directly from the second terminal 200 via short distance communication.

The short distance communication technology may use a wireless LAN, a Bluetooth, ultra wideband (UWB), Zigbee, near field communication (NFC), Wi-Fi direct (WFD), or infrared data association (IrDA) communication technology.

According to another exemplary embodiment, the first terminal 100 may receive the second interest keyword information from the second terminal 200 through an external server.

According to an exemplary embodiment, the second interest keyword information may be information about the second interest keyword to which at least one from among the second location information and the second time information is mapped. In addition, the second interest keyword, the second location information, and the second time information may be generalized as higher level information.

The first terminal 100 may receive second interest keyword information in an extraction frequency matrix format of the second interest keyword, or may receive a plurality of second feature vectors that are obtained by performing non-negative matrix factorization on the second interest keyword information in the extraction frequency matrix format from the second terminal 200.

According to an exemplary embodiment, the first terminal 100 may compare the first interest keyword information and the second interest keyword information with each other (operation S340). That is, the first terminal 100 may compare the second interest keyword information received from the second terminal 200 and the first interest keyword information acquired by the first terminal 100 with each other.

Here, according to an exemplary embodiment, the first terminal 100 may compare the first interest keyword information about the first interest keyword that is generalized as the higher level word and the second interest keyword information about the second interest keyword that is generalized as the higher level word.

According to an exemplary embodiment, the first terminal 100 may compare the plurality of the first feature vectors of the first interest keyword information, which are obtained through the non-negative matrix factorization, and the plurality of second feature vectors of the second interest keyword information, which are obtained through the non-negative matrix factorization, with each other.

Otherwise, the first terminal 100 of an exemplary embodiment may acquire an extraction frequency matrix of the second interest keyword by calculating the plurality of the second feature vectors received from the second terminal 200, and then, may compare the extraction frequency matrix of the first interest keyword and the extraction frequency matrix of the second interest keyword with each other.

According to an exemplary embodiment, the first terminal 100 may recommend the user of the second terminal 200 as a friend based on a result of comparing the first interest keyword information and the second interest keyword information with each other (operation S350). That is, according to an exemplary embodiment, the first terminal 100 calculates a similarity between the first interest keyword information and the second interest keyword information, and may recommend the user of the second terminal 200 as a friend when the calculated similarity is equal to or greater than a predetermined value.

Here, according to an exemplary embodiment, the first terminal 100 may calculate the similarity by calculating RMSE values of the first interest keyword information and the second interest keyword information. As the RMSE values of the first interest keyword information and the second interest keyword information are small, the similarity between the first interest keyword information and the second interest keyword information is high.

Therefore, the first terminal 100 recommends a user of an external device having common interest keywords as a friend so that the user of the first terminal 100 is capable of forming a certain connection with users of external devices having common interests.

Hereinafter, the operation S320 shown in FIG. 3 will be described in more detail with reference to FIG. 4.

FIG. 4 is a flowchart illustrating a method of acquiring first interest keyword information by the first terminal 100, according to an exemplary embodiment.

In operation S405, the first terminal 100 may analyze the collected event information. In operation S410, the first terminal 100 may extract a plurality of candidate keywords from the event information through the NLP technology. That is, the first terminal 100 may extract proper nouns (named-entities) from the text or voice message/e-mail/phone call/SNS information as the candidate keywords. For example, if the user of the first terminal 100 sends a text message "Do you want to go to the baseball park tonight for the baseball game between team A and team B?" to a friend, the first terminal 100 may extract the words such as team A, team B, baseball game, and baseball park through the NLP technology.

The user of the first terminal 100 may set a picture of a dog as a background image of the first terminal 100, may post information about pets on an SNS server, and may send/receive text messages about pets with friends, since the user of the first terminal 100 is interested in pets. In this case, the first terminal 100 may extract candidate keywords such as Siamese, Russian Blue, Persian, Turkish Angora, Birman, Ragdoll, Bombay, Maine Coon that are breeds of cats, candidate keywords such as Chihuahua, Maltese, Papillon, Shih Tzu, Poodle, Beagle, Dachshund, Fox Hound, Siberian Husky, Pointer, Setter, Cocker Spaniel, and Vizsla that are breeds of dogs, and candidate keywords such as rabbits, hamsters, guinea pigs, and hedgehogs.

In operation S415, the first terminal 100 may select at least one or more first interest keywords from among the candidate keywords. According to an exemplary embodiment, the first terminal 100 may select the first interest keyword from among the candidate keywords based on the number of times each of the candidate keywords are extracted.

For example, the first terminal 100 may select the candidate keyword, of which the extracted times are within a predetermined ratio (for example, 10% from the top) as the first interest keyword, and may select a predetermined number of candidate keywords (for example, 30 candidate keywords) as the first interest keywords in an order of the extracted times.

In operation S420, the first terminal 100 may acquire the first location information and/or the first time information corresponding to the first interest keyword. The first location information corresponding to the first interest keyword denotes information about a location where the event, from which the first interest keyword is extracted, occurs. In addition, the first time information corresponding to the first interest keyword denotes information about a time when the event, from which the first interest keyword is extracted, occurs. For example, if the first interest keyword is extracted from a text message that is sent at a time B and a location A, the first terminal 100 may acquire the information about the location A as the location information corresponding to the first interest keyword and the information about the time B as the time information corresponding to the first interest keyword.

If the first interest keyword is extracted from a plurality of pieces of the event information, the first terminal 100 may determine main locations and main times of the plurality of events as the first location information and the first time information corresponding to the first interest keyword. This will be described in more detail with reference to FIGS. 5A and 5B.

Figure 5A:
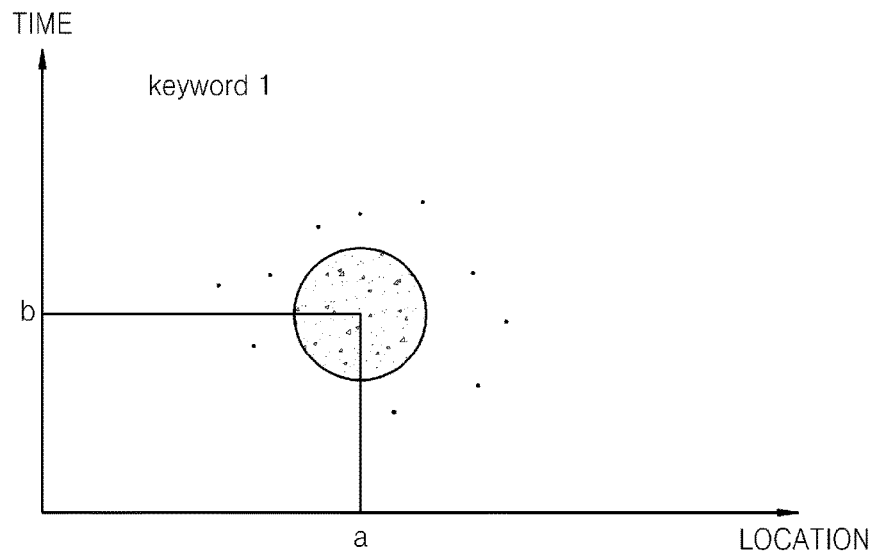
FIGS. 5A and 5B are diagrams showing first location information and first time information corresponding to first interest keyword information, according to an exemplary embodiment.
Figure 5B:
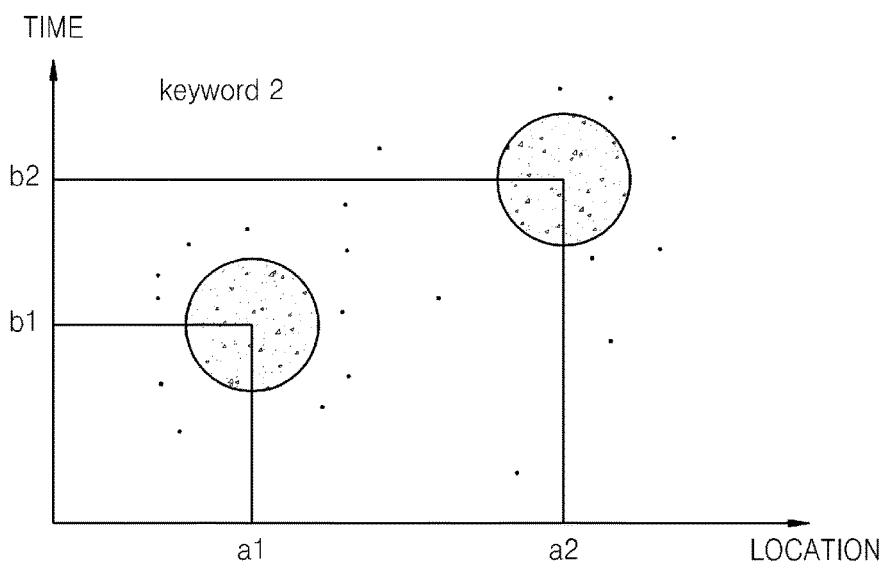

FIGS. 5A and 5B are graphs showing the first location information and the first time information corresponding to the first interest keyword, according to an exemplary embodiment.

As shown in FIG. 5A, a location corresponding to a keyword 1 may be a location a where the keyword 1 is mainly collected, and a time corresponding to the keyword 1 may be a time b when the keyword 1 is mainly collected.

There may be a plurality of pieces of the first location information and the first time information with respect to one first interest keyword. As shown in FIG. 5B, if there are a plurality of locations and times where a keyword 2 is mainly collected, locations a1 and a2 correspond to the keyword 2 and the times b1 and b2 correspond to the keyword 2.

The first location information of an exemplary embodiment may include coordinate information represented by latitude and longitude. For example, the first location information may be represented as 'latitude: 37.4872222, longitude: 127.0530792'. The first time information may be represented by at least one from among year, quarter, month, week, day, AM/PM, time, minute, and second.

In operation S425, the first terminal 100 may generalize at least one from among the first location information and the first time information as higher level information. For example, the first location information represented as GPS coordinate values (latitude: 37.4872222, longitude: 127.0530792) may be generalized as higher level information so as to represent the first location information as a higher level concept, for example, zone, building, address, area name, city name, and country name. In addition, the first time information represented by the time, minute, and second units (for example, PM 5:10:30, Oct. 9, 2012) may be generalized as higher level information to be represented by morning/afternoon/evening, day, week, month, year units, holiday, weekend, workday, day of the week, and/or another range of time.

The first terminal 100 of an exemplary embodiment may set a generalization level for generalizing at least one from among the first location information and the first time information as the higher level information based on a user input.

According to an exemplary embodiment, the first terminal 100 may generalize the first location information and/or the first time information as the higher level information so as to prevent personal information of the user from being exposed to outside.

In operation S430, the first terminal 100 may map at least one from among the first location information and the first time information to the first interest keyword. That is, the first terminal 100 may map the first location information to the first interest keyword, may map the first time information to the first interest keyword, or may map the first location information and the first time information to the first interest keyword.

In operation S435, the first terminal 100 may generalize the first interest keyword as a higher level word. That is, according to an exemplary embodiment, the first terminal 100 may generalize the first interest keyword as the higher level word based on WordNet (a hierarchical lexical database). Here, the first terminal 100 may generalize the first interest keyword as the higher level word according to the preset generalization level. This will be described with reference to FIG. 6.

Figure 6:
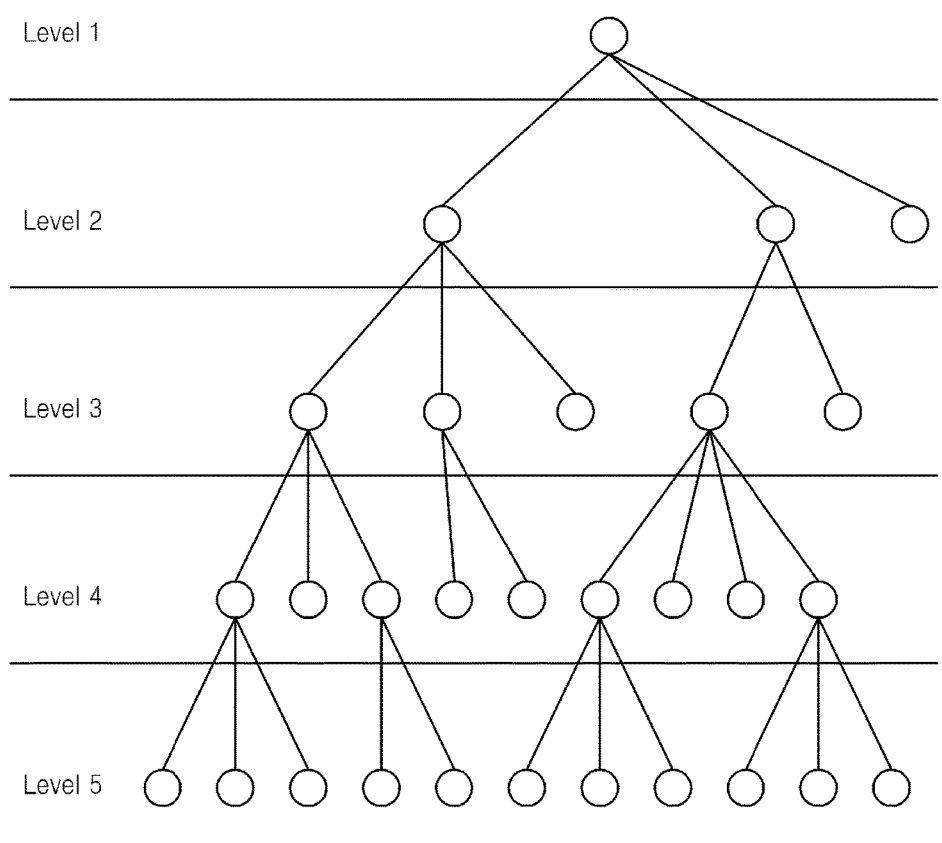
FIG. 6 is a conceptual view of a WordNet (a hierarchical lexical database) according to an exemplary embodiment.

FIG. 6 is a conceptual view of WordNet relating to an exemplary embodiment.

If the first interest keyword selected by the first terminal 100 is information belonging to a fifth level (level 5) of the WordNet, the first terminal 100 may generalize the first interest keyword as the higher level word that belongs to a fourth level (level 4) or a third level (level 3) that is a preset generalization level.

For example, when the breeds of cats, that is, Siamese, Russian Blue, and Persian, are selected as the first interest keywords, the first terminal 100 may generalize the first interest keywords as a higher level word, that is, cats or pets. According to an exemplary embodiment, since the first interest keywords are generalized (or anonymized), the personal information of the user may be protected.

According to an exemplary embodiment, the first terminal 100 may set the generalization level for generalizing the first interest keyword as the higher level word.

In operation S440, the first terminal 100 may remap the first location information and/or the first time information to the generalized first interest keyword. Here, the first location information and/or the first time information may be also generalized as higher level information.

In operation S445, the first terminal 100 may generate the first interest keyword information in a matrix format. For example, the first terminal 100 generates an extraction frequency matrix of the generalized first interest keyword by setting the generalized first interest keyword as a first axis and at least one from among the first location information and the first time information as a second axis. This will be described with reference to FIG. 7.

FIG. 7 is a diagram showing an extraction frequency matrix of the first interest keyword, according to an exemplary embodiment.

As shown in FIG. 7, when a keyword 1 is extracted 10 times from information about an event occurring in the morning in Suwon city, extracted once from information about an event occurring at dawn in Seoul, and extracted 5 times from information about an event occurring in the evening in Seoul, a keyword 2 is extracted four times from information about an event occurring at noon in Suwon city, and a keyword 3 is extracted 23 times from information about an event occurring in the afternoon in Suwon city, the first terminal 100 may generate an extraction frequency matrix about N number of first interest keywords based on the location and/or time.

In operation S450, the first terminal 100 may perform non-negative matrix factorization on the extraction frequency matrix about the first interest keyword. In addition, in operation S455, the first terminal 100 may acquire a plurality of first feature vectors as a result of the non-negative matrix factorization. This will be described with reference to FIG. 8.

FIG. 8 is a diagram showing a non-negative matrix factorization (NMF) result of the extraction frequency matrix about the first interest keyword, according to an exemplary embodiment.

As shown in FIG. 8, the first terminal 100 may represent one extraction frequency matrix about the first interest keyword as a linear combination of two feature vectors. For example, the first terminal 100 performs an NMF operation on an M×N matrix shown in FIG. 7 to obtain two first feature vectors (a M×K feature vector and a K×N feature vector).

Here, when it is assumed that M. 10,000, N=10,000, K=20, and an element configuring the matrix is 1 B (byte), a size of the M×N matrix is 100 MB. However, a size of each of the plurality of first feature vectors is 400 KB, and thus, the size of the plurality of first feature vector may be relatively much smaller than that of the extraction frequency matrix of the first interest keyword.

Therefore, when the first terminal 100 transmits the first feature vectors to an external device, a data transfer amount may be greatly reduced when compared with the transfer of the extraction frequency matrix of the first interest keyword.

In addition, the second interest keyword information may be acquired by the second terminal 200 by using the method shown in FIG. 4.

Figure 9:
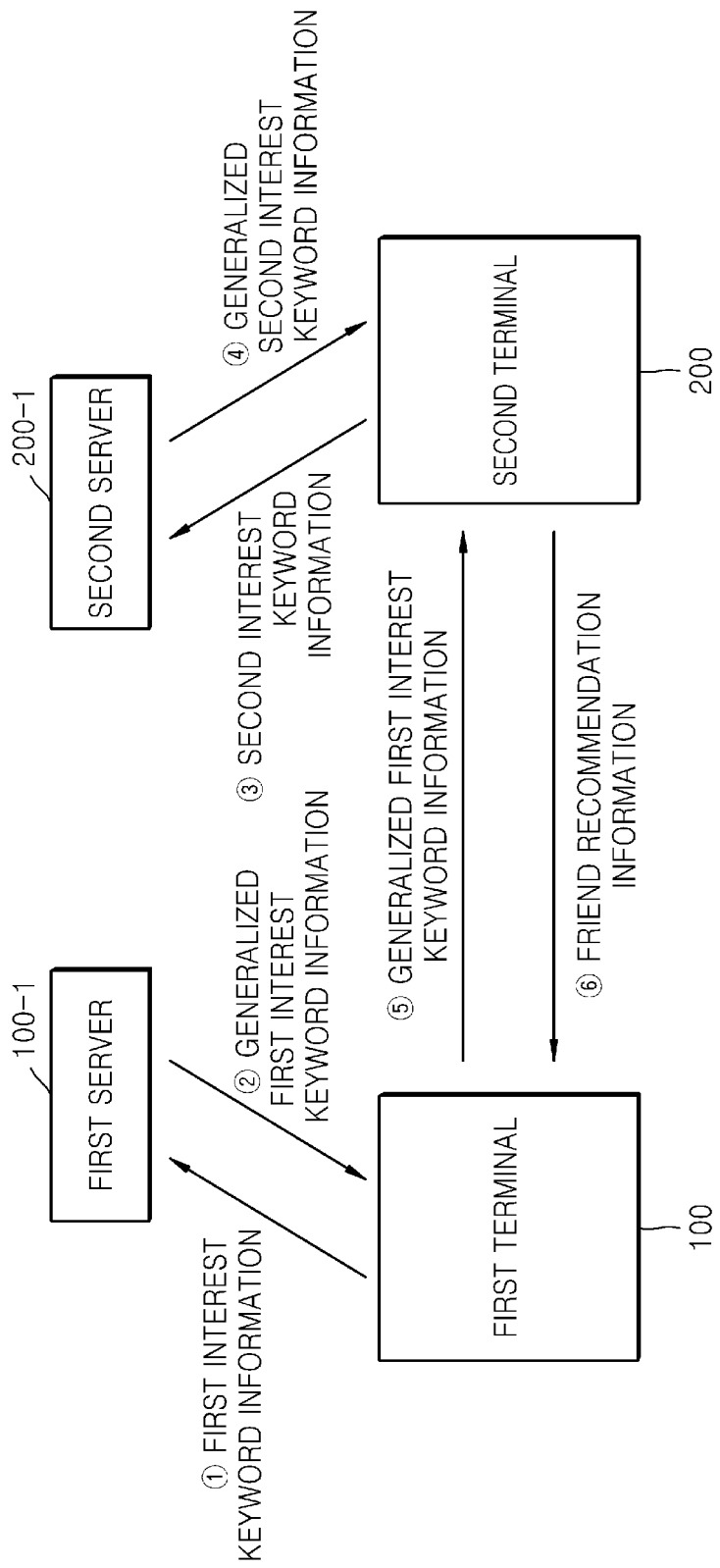
FIG. 9 is a diagram illustrating a method of recommending friends, in a first terminal, according to an aspect of another exemplary embodiment.

FIG. 9 is a diagram illustrating a method of recommending friends in a first terminal 100 according to another exemplary embodiment.

A first server 100-1 is a private server of the first terminal 100, and may store WordNet (a hierarchical lexical database) for generalizing the first interest keyword information as higher level information.

Therefore, the first terminal 100 may transmit the first interest keyword information that is extracted by analyzing collected event information to the first server 100-1 (process ①). Here, the first interest keyword information may include the first interest keyword, the first time information, and the first location information.

The first server 100-1 may generalize the first interest keyword information as the higher level information based on generalization level information that is set in advance. For example, the first server 100-1 may generalize at least one from among the first location information and the first time information as higher level information, and then, may map the generalized information to the first interest keyword. The first server 100-1 may generalize the first interest keyword as a higher level word based on the WordNet (a hierarchical lexical database), and may map at least one from among the first location information and the first time information to the generalized first interest keyword. In addition, the first server 100-1 may transmit the generalized first interest keyword information to the first terminal 100 (process ②).

A second server 200-1 is a private server of the second terminal 200, and may store the WordNet for generalizing the second interest keyword information as higher level information. Therefore, when the second terminal 200 transmits the second interest keyword information to the second server 200-1 (process ③), the second terminal 200 may receive generalized second interest keyword information from the second server 200-1 (process ④).

According to an exemplary embodiment, the first terminal 100 may transmit the generalized first interest keyword information to the second terminal 200 (process ⑤). Here, according to an exemplary embodiment, the first terminal 100 may transmit the plurality of first feature vectors that are generated through the NMF operation of the first interest keyword information to the second terminal 200.

The second terminal 200 may recommend the user of the first terminal 100 as a friend to the user of the second terminal 200 based on a result of comparing the generalized first interest keyword information and the generalized second interest keyword information with each other. That is, if an accordance rate between the generalized first interest keyword information and the generalized second interest keyword information is a predetermined level or greater, the second terminal 200 recommends the user of the first terminal 100 as a friend. Here, the second terminal 200 may compare the first feature vectors of the first interest keyword information and the second feature vectors of the second interest keyword information with each other.

In addition, if the second terminal 200 recommends the user of the first terminal 100 as a friend to the user of the second terminal 200, the second terminal 200 may transmit friend recommendation information to the first terminal 100. For example, the second terminal 200 may transmit the accordance rate information between the generalized first interest keyword information and the generalized second interest keyword information, and the information of recommending the user of the second terminal 200 as a friend to the first terminal 100. In this case, according to an exemplary embodiment, the first terminal 100 may recommend the user of the second terminal 200 as a friend to the user of the first terminal 100.

According to an exemplary embodiment, a user of the first terminal 100 and a user of the second terminal 200 may specify which ones of the generalized interest keyword information may be used to match the user of the first terminal 100 and the user of the second terminal 200. For example, a user of the first terminal 100 or the second terminal 200, may select and/or rank one more keywords that are used to match the user with another user of another terminal.

Figure 10:
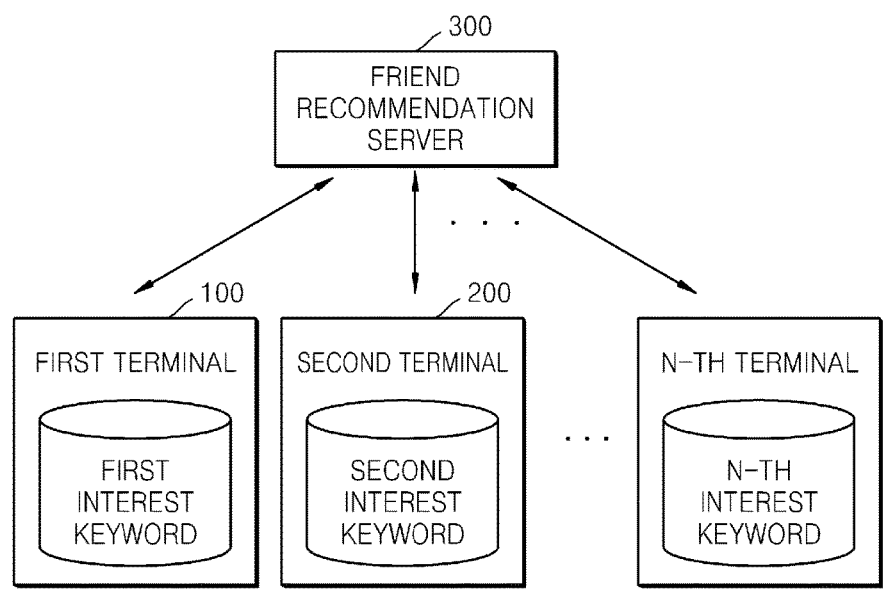
FIG. 10 is a friend recommending system according to an aspect of another exemplary embodiment.

FIG. 10 is a friend recommending system according to another exemplary embodiment.

As shown in FIG. 10, the friend recommending system according to an exemplary embodiment may include a friend recommendation server 300, the first terminal 100, the second terminal 200, . . . , and an N-th terminal. That is, the friend recommendation server 300 acquires interest keyword information from a plurality of terminals, and may recommend users of terminals having common interest keyword information as friends to each other. Hereinafter, the first terminal 100 and the second terminal 200 will be described from among the plurality of terminals, for convenience of description.

The first terminal 100 may collect event information, and acquire the first interest keyword information from the collected event information. The event information collected by the first terminal 100 may include location information of the first terminal 100, network information, user status information, sent/received message information, sent/received e-mail information, phone call list information, SNS usage information, application usage information, web page usage information, and payment information. These are described above with reference to FIGS. 1 and 2, and thus, will not be described here.

The first terminal 100 may transmit the acquired first interest keyword information to the friend recommendation server 300. Here, the first terminal 100 may transmit the first interest keyword information, to which the first location information and/or the first time information is mapped, in a matrix format, or may transmit a plurality of first feature vectors about the first interest keyword, which are obtained through an NMF operation, to the friend recommendation server 300.

According to an exemplary embodiment, the first terminal 100 may generalize the first interest keyword and may transmit the first interest keyword information about the generalized first interest keyword to the friend recommendation server 300.

The second terminal 200 may collect event information, and may acquire second interest keyword information from the collected event information. The event information collected by the second terminal 200 may include location information of the second terminal 200, network information, user status information, sent/received message information, sent/received e-mail information, phone call list information, SNS usage information, application usage information, web page usage information, and payment information.

The second terminal 200 may transmit the acquired second interest keyword information to the friend recommendation server 300. Here, the second terminal 200 may transmit the second interest keyword information, to which the second location information and/or the second time information is mapped, in a matrix format, or may transmit a plurality of second feature vectors about the second interest keyword, which are obtained through an NMF operation, to the friend recommendation server 300.

According to an exemplary embodiment, the second terminal 200 may generalize the second interest keyword and may transmit the second interest keyword information about the generalized second interest keyword to the friend recommendation server 300.

The friend recommendation server 300 is a server for providing a plurality of terminals with friend recommendation information. The friend recommendation server 300 of an exemplary embodiment may be a server for providing a certain service based on relationship between the users. For example, the friend recommendation server 300 may be an SNS server or a server for providing a messenger service.

The friend recommendation server 300 according to an exemplary embodiment will be described in detail with reference to FIG. 11.

Figure 11:
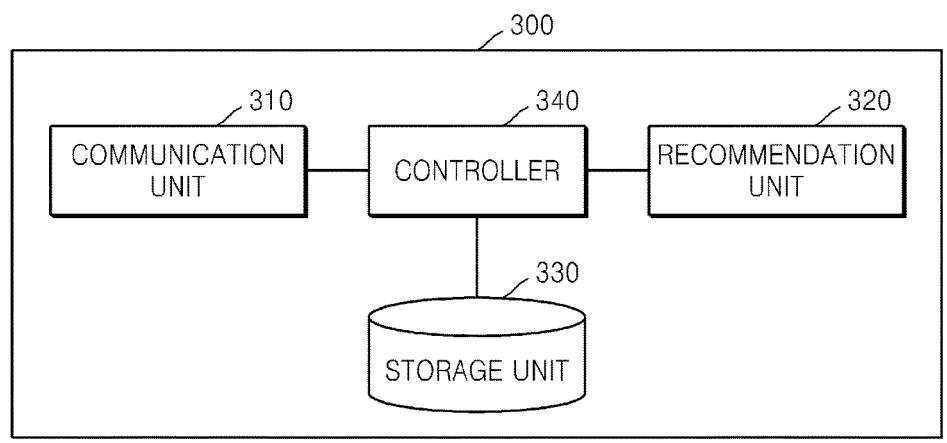
FIG. 11 is a block diagram of a friend recommending server according to an exemplary embodiment.

FIG. 11 is a block diagram of the friend recommendation server 300 according to an exemplary embodiment.

As shown in FIG. 11, the friend recommendation server 300 of an exemplary embodiment may include a communication unit 310, a recommendation unit 320, a storage unit 330, and a controller 340. However, the friend recommendation server 300 may be configured to include more or less components than those of FIG. 11.

Hereinafter, the above components will be described.

The communication unit 310 may include one or more components enabling the friend recommendation server 300 to communicate with an external device and a network in which the external device is located. For example, the communication unit 310 may include a wireless Internet module, a mobile communication module, a wired Internet module, and a short distance communication module.

The communication unit 310 may receive the first interest keyword information that is acquired based on the event information collected by the first terminal 100 from the first terminal 100. The communication unit 310 may receive the first interest keyword information in the extraction frequency matrix format about the generalized first interest keyword from the first terminal 100, or may receive a plurality of first feature vectors generated through the NMF of the first interest keyword information in the extraction frequency matrix format from the first terminal 100.

The communication unit 310 may receive the second interest keyword information acquired based on the event information collected by the second terminal 200, from the second terminal 200. The communication unit 310 may receive the second interest keyword information in the extraction frequency matrix format about the generalized second interest keyword from the second terminal 200, or may receive a plurality of second feature vectors generated through the NMF of the second interest keyword information in the extraction frequency matrix format from the second terminal 200.

According to an exemplary embodiment, the communication unit 310 may acquire the location information of the first terminal 100 and the location information of the second terminal 200. The communication unit 310 may receive the location information of the first and second terminals 100 and 200 directly from the first and second terminals 100 and 200, or may receive the location information of the first and second terminals 100 and 200 via a base station.

The communication unit 310 may receive the first interest keyword information and the second interest keyword information for a predetermined time period from the first terminal 100 and the second terminal 200 located at predetermined locations.

In addition, the communication unit 310 may transmit friend recommendation information to at least one of the first terminal 100 and the second terminal 200. The friend recommendation information may include information about the user who is recommended as a friend (name, nickname, ID, age, SNS that the user uses, current location, and telephone number, etc.), and common interest information.

The friend recommendation unit 320 may compare the first interest keyword information and the second interest keyword information with each other. According to an exemplary embodiment, the recommendation unit 320 may compare the first interest keyword information of the first interest keyword that is generalized as a higher level word, and the second interest keyword information that is generalized as a higher level word with each other. The recommendation unit 320 may compare the plurality of first feature vectors about the first interest keyword information and the plurality of second feature vectors about the second interest keyword information, wherein the first and second feature vectors are generated through the NMF operation.

The friend recommendation unit 320 of an exemplary embodiment may provide at least one of the first and second terminals 100 and 200 with the friend recommendation information, based on a result of comparing the first interest keyword information and the second interest keyword information with each other. That is, the friend recommendation unit 320 of an exemplary embodiment calculates a similarity between the first interest keyword information and the second interest keyword information, and when the calculated similarity is a predetermined value or greater, the friend recommendation unit 320 may recommend the user of the second terminal 200 as a friend to the user of the first terminal 100 or recommend the user of the first terminal 100 as a friend to the user of the second terminal 200. For example, if the similarity between the first interest keyword information and the second interest keyword information is 80% or greater, the friend recommendation unit 320 provides the first terminal 100 with the friend recommendation information including the user information of the second terminal 200, and provides the second terminal 200 with the friend recommendation information including the user information of the first terminal 100.

According to an exemplary embodiment, the friend recommendation unit 320 may calculate the similarity by calculating RMSE values of the first interest keyword information and the second interest keyword information.

In addition, the friend recommendation unit 320 may provide at least one of the first and second terminals 100 and 200 with the friend recommendation information in further consideration of the location of the first terminal 100 and the location of the second terminal 200. That is, when the first terminal 100 is located within a predetermined distance from the second terminal 200, the friend recommendation unit 320 may recommend the user of the first terminal 100 as a friend to the user of the second terminal 200, or may recommend the user of the second terminal 200 as a friend to the user of the first terminal 100.

The storage unit 330 may store processing and controlling programs of the controller 340, or may store input/output data (for example, the first interest keyword information, the second interest keyword information, and the friend recommendation information).

The controller 340 may control overall operations of the friend recommendation server 300. That is, the controller 340 may control the communication unit 310, the friend recommendation unit 320, and the storage unit 330.

The controller 340 of an exemplary embodiment may delete the first interest keyword information and the second interest keyword information after a predetermined time period has passed, in order to protect the personal information of the users of the first and second terminals 100 and 200.

Hereinafter, a method of recommending a friend by the friend recommendation server 300 based on the interest keyword information will be described with reference to FIGS. 12 and 13.

Figure 12:
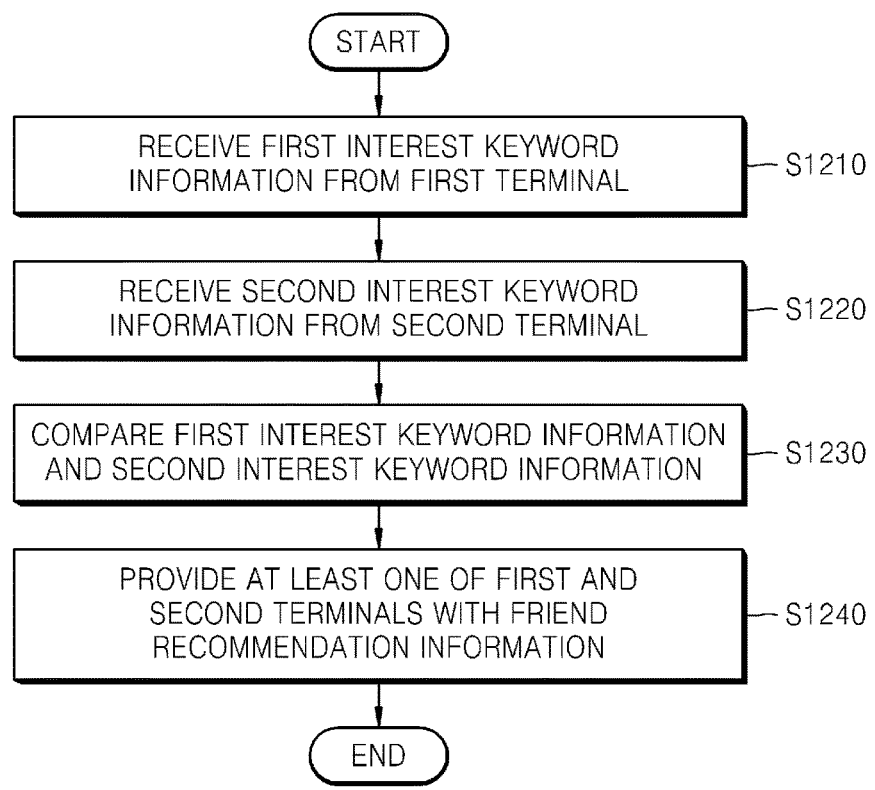
FIG. 12 is a flowchart illustrating a method of recommending friends, in the friend recommending server, according to an exemplary embodiment.

FIG. 12 is a flowchart illustrating a method of recommending friends by the friend recommendation server 300, according to an exemplary embodiment.

Referring to FIG. 12, the method of recommending friends by the friend recommendation server 300 according to an exemplary embodiment may include time-serial processes performed in the friend recommendation server 300 shown in FIG. 11. Therefore, the above descriptions about the friend recommendation server 300 shown in FIG. 11 may be applied to the method of recommending friends shown in FIG. 12.

In operation S1210, the friend recommendation server 300 may receive the first interest keyword information that is acquired based on the event information collected by the first terminal 100, from the first terminal 100.

Here, according to an exemplary embodiment, the friend recommendation server 300 may receive the information about the first interest keyword to which at least one of the first location information and the first time information is mapped. That is, at least one of the location information and the time information may be mapped to each of one or more first interest keywords included in the first interest keyword information. For example, a keyword 1 may be mapped to (region A, morning), a keyword 2 may be mapped to (region B, noon), and a keyword 3 may be mapped to (region C, afternoon).

According to an exemplary embodiment, at least one of the first location information and the first time information included in the first interest keyword information may be information that is generalized as higher level information. In addition, according to an exemplary embodiment, the first interest keyword information may include information about the first interest keyword that is generalized as a higher level word based on WordNet (a hierarchical lexical database), in order to prevent personal information of the user of the first terminal 100 from being exposed to unauthorized users.

According to an exemplary embodiment, the friend recommendation server 300 may receive the first interest keyword information in the extraction frequency format about the generalized first interest keyword, wherein the matrix has the generalized first interest keyword as a first axis and at least one of the first location information and the first time information as a second axis.

The friend recommendation server 300 may receive a plurality of first feature vectors that are generated by an NMF of the first interest keyword information in the extraction frequency matrix format. In this case, the first feature vectors have a smaller data amount than that of the extraction frequency matrix, and thus, data transmission efficiency may be improved.

In operation S1220, the friend recommendation server 300 may receive the second interest keyword information that is acquired based on the event information collected by the second terminal 200, from the second terminal 200. Here, according to an exemplary embodiment, the friend recommendation server 300 may receive information about the second interest keyword to which at least one of the second location information and the second time information is mapped. That is, at least one of the location information and the time information may be mapped to each of the one or more second interest keywords included in the second interest keyword information.

According to an exemplary embodiment, at least one of the second location information and the second time information included in the second interest keyword information may be information that is generalized as higher level information. In addition, according to an exemplary embodiment, the second interest keyword information may include information about the second interest keyword that is generalized as a higher level word based on WordNet (a hierarchical lexical database), in order to prevent personal information of the user of the second terminal 200 from being excessively exposed.

According to an exemplary embodiment, the friend recommendation server 300 may receive the second interest keyword information in the extraction frequency format about the generalized second interest keyword, wherein the matrix has the generalized second interest keyword as a first axis and at least one of the second location information and the second time information as a second axis.

The friend recommendation server 300 may receive a plurality of second feature vectors that are generated by an NMF of the second interest keyword information in the extraction frequency matrix format.

In operation S1230, the friend recommendation server 300 may compare the first interest keyword information and the second interest keyword information with each other.

The friend recommendation server 300 may compare the first interest keyword information about the first interest keyword that is generalized as a higher level word and the second interest keyword information about the second interest keyword that is generalized as a higher level word.

According to an exemplary embodiment, the friend recommendation server 300 may compare the plurality of first feature vectors about the first interest keyword information and the second feature vectors about the second interest keyword information with each other, wherein the first and second feature vectors are generated through the NMF operation.

In addition, the friend recommendation server 300 may determine whether a distance between the first terminal 100 and the second terminal 200 is within a predetermined range (for example, a radius of 100 m) by comparing the locations of the first terminal 100 and the second terminal 200 with each other. The friend recommendation server 300 may also determine whether the first terminal 100 and the second terminal 200 are located in at same building, address, business, region, zone, etc.

In operation S1240, the friend recommendation server 30 may provide at least one of the first and second terminals 100 and 200 with the friend recommendation information based on a result of comparing the first interest keyword information and the second interest keyword information. That is, according to an exemplary embodiment, the friend recommendation server 300 may calculate a similarity between the first interest keyword information and the second interest keyword information, and may provide the first terminal 100 and/or the second terminal 200 with the friend recommendation information when the calculated similarity is a predetermined value or greater.

Here, according to an exemplary embodiment, the first terminal 100 may calculate the similarity by calculating RMSE values of the first interest keyword information and the second interest keyword information. As the RMSE values of the first interest keyword information and the second interest keyword information decrease, the similarity between the first and second interest keyword information increases.

Therefore, according to an exemplary embodiment, the users may receive recommendation of other users having similar interest as friends.

Figure 13:
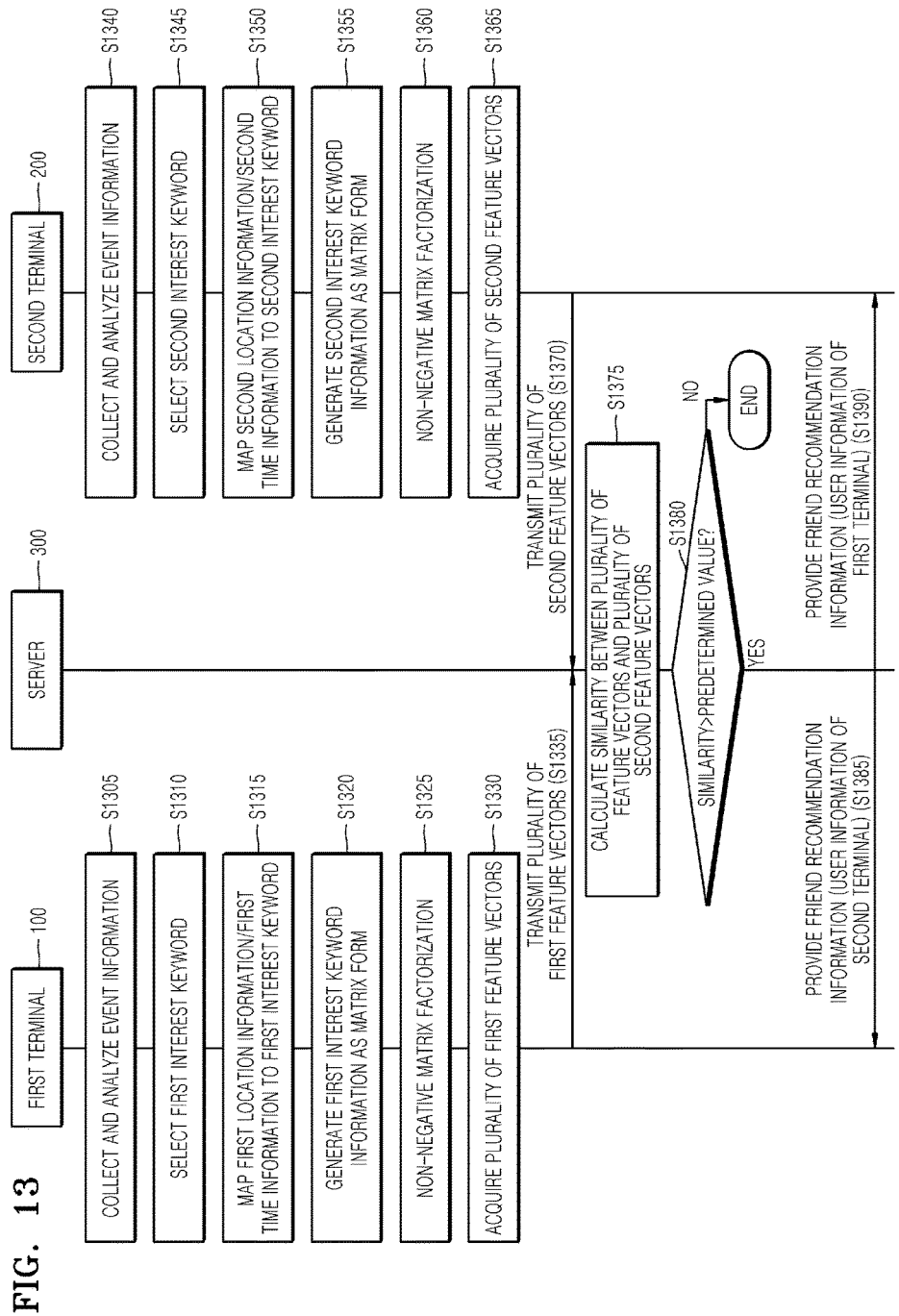
FIG. 13 is a flowchart illustrating a method of recommending friends, in the friend recommending server, in more detail, according to an exemplary embodiment.

FIG. 13 is a flowchart illustrating a method of recommending friends of the friend recommendation server 300, in more detail, according to an exemplary embodiment in more detail.

According to an exemplary embodiment, the first terminal 100 collects and analyzes the event information (operation S1305), selects the first interest keyword (operation S1310), maps the first location information and/or the first time information to the first interest keyword (operation S1315), generates the first interest keyword information as an extraction frequency matrix of the first interest keyword (operation S1320), and performs the NMF operation of the first interest keyword information in the extraction frequency matrix form (operation S1325) to obtain a plurality of first feature vectors (operation S1330). Operations S1305 through S1330 shown in FIG. 13 correspond to operations S405 through S455 shown in FIG. 4, and thus, detailed descriptions thereof will not be provided here.

In addition, the second terminal 200 collects and analyzes the event information (operation S1340), selects a second interest keyword (operation S1345), maps the second location information and/or the second time information to the second interest keyword (operation S1350), generates the second interest keyword information as an extraction frequency matrix of the second interest keyword (operation S1355), and performs an NMF operation of the second interest keyword information in the extraction frequency matrix form (operation S1360) to obtain a plurality of second feature vectors (operation S1365).

Here, the friend recommendation server 300 receives the first feature vectors from the first terminal 100 (operation S1335) and receives the second feature vectors from the second terminal 200 (operation S1370). The friend recommendation server 300 according to an exemplary embodiment calculates the similarity between the plurality of first feature vectors and the plurality of the second feature vectors (operation S1375). When the calculated similarity is a predetermined value or greater (operation S1380), the friend recommendation server 300 transmits friend recommendation information including user information of the second terminal 200 to the first terminal 100 (operation S1385), and transmits the friend recommendation information including user information of the first terminal 100 to the second terminal 200 (operation S1390). The user information of the first terminal 100 and the user information of the second terminal 200 may include user identification information (for example, phone number, ID, nickname, and name), user identification images (for example, profile photo), and user phone number.

Figure 14:
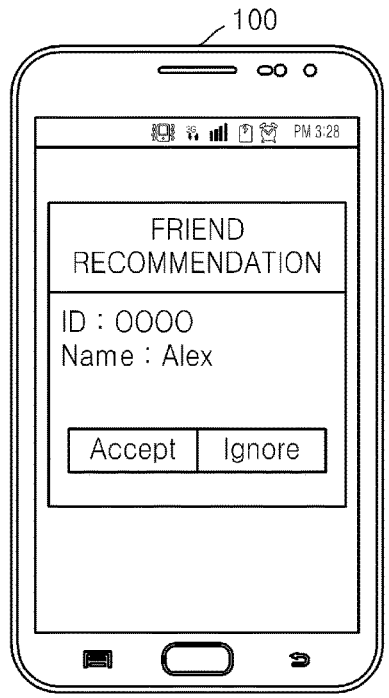
FIG. 14 is a diagram showing a friend recommending screen in the first terminal, according to an exemplary embodiment.

FIG. 14 is a diagram showing a friend recommendation screen of the first terminal 100, according to an exemplary embodiment.

The first terminal 100 may output a friend recommendation window on a screen in order to recommend the user of the second terminal 200 as a friend. Here, the first terminal 100 may output a friend recommendation alarm through a voice signal or a vibration signal.

According to an exemplary embodiment, the friend recommendation window may display an ID, a name, and an accept/ignore selection icon.

Figure 15:
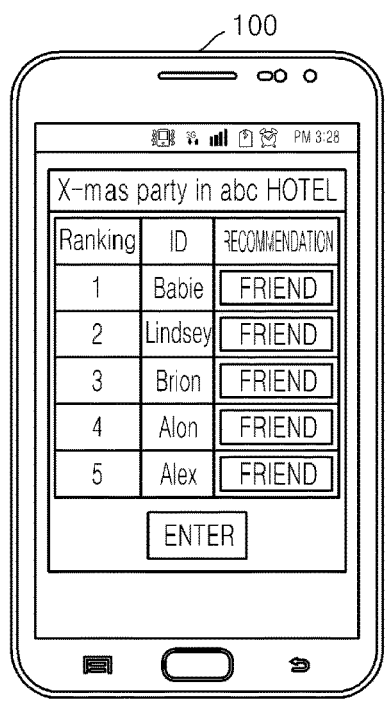
FIG. 15 is a diagram showing a friend recommending screen among a plurality of terminals existing in a certain time and space.

FIG. 15 is a diagram showing a friend recommendation screen between a plurality of terminals existing in a certain time and a certain place.

According to an exemplary embodiment, the friend recommendation server 300 may generate a virtual interest keyword collection space that is maintained for a predetermined time, and when the predetermined time has passed, the friend recommendation server 300 may delete the contents stored in the virtual interest keyword collection space to protect personal information of the users.

For example, the friend recommendation server 300 may collect the interest keyword information from a plurality of terminals during a certain party. In addition, the friend recommendation server 300 connects the users having common interest keyword information, and when the party is over, the friend recommendation server 300 may delete the collected interest keyword information.

As shown in FIG. 15, the user of the first terminal 100 may receive friend recommendations of Babie, Lindsey, Brian, Alon, and Alex as friends from among a plurality of users participating in a Christmas party taking place in "ABC Hotel", in an order of similarity of the interest keyword information. Here, when the user of the first terminal 100 selects Babie and Brian as friends, the user of the first terminal 100 may form a new relationship with Babie and Brian.

Figure 16A:
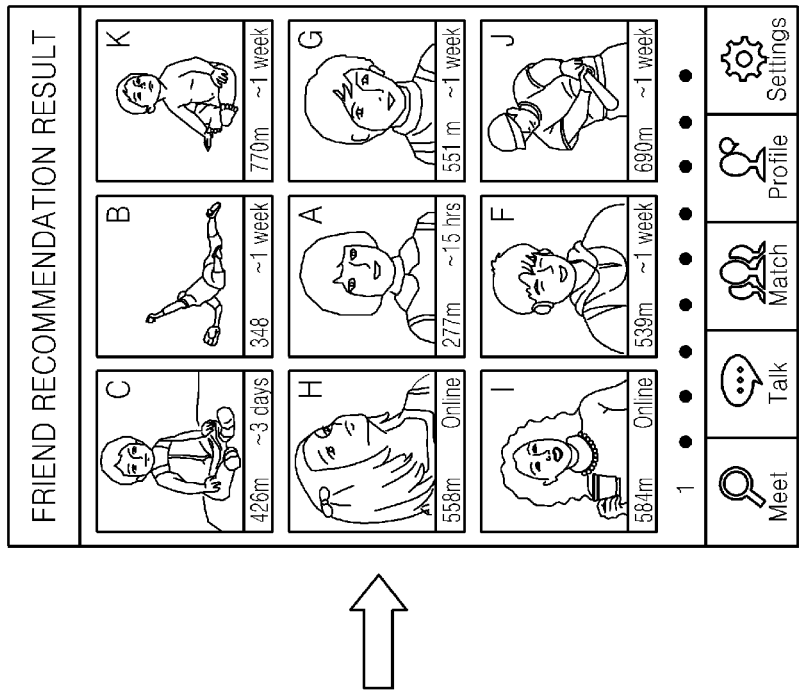
FIGS. 16A and 16B are diagrams showing a friend recommending screen displayed by the first terminal via a social networking service (SNS) application.
Figure 16B:
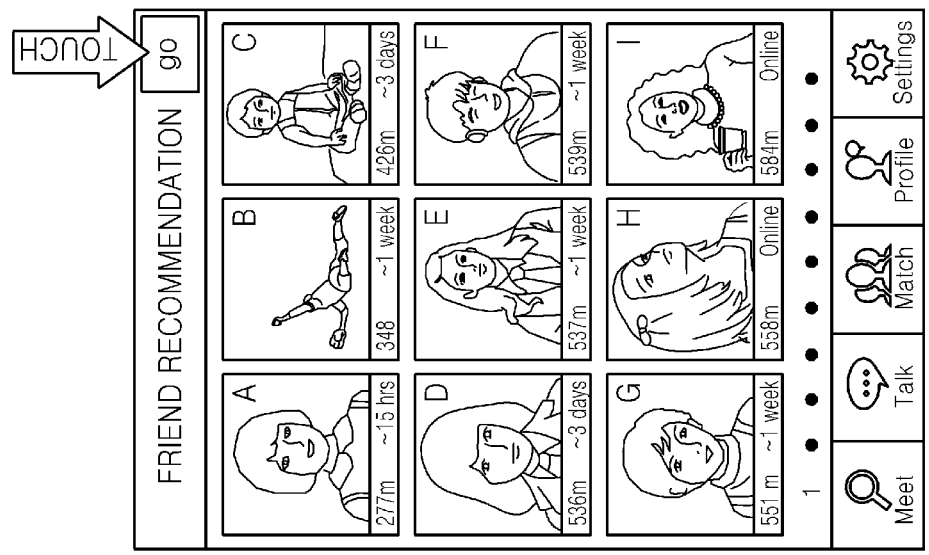

FIGS. 16A and 16B are diagrams showing a friend recommendation screen displayed through an SNS application by the first terminal 100, according to an exemplary embodiment.

As shown in FIG. 16A, the first terminal 100 may execute an SNS application providing a general location-based SNS. In this case, the first terminal 100 may display a users list in an order of distances from the first terminal 100. For example, the first terminal 100 may display the users list of the SNS application in an order of user A of a terminal A who is 277 m apart from the first terminal 100, user B of a terminal B who is 348 m apart from the first terminal 100, and user C of a terminal C who is 426 m apart from the first terminal 100.

Here, when the user of the first terminal 100 selects the friend recommendation according to an exemplary embodiment, the first terminal 100 or the friend recommendation server 300 compares interest keyword information acquired from external devices with the first interest keyword information of the first interest keyword information to recommend the users having similar interests as friends.

That is, the first terminal 100 or the friend recommendation server 300 may provide the friend recommendation list based on an order of terminals transferring the interest keyword information having high accordance rate with the first interest keyword information of the first terminal 100. For example, as shown in FIG. 16B, the first terminal 100 may display the friend recommendation list in an order of accordance rates between the interest keyword information, that is, user C (accordance rate: 77%), user B (accordance rate: 73%), and user K (accordance rate: 72%).

Therefore, according to an exemplary embodiment, the users having high relevance with respect to the user of the first terminal 100 may be recommended as friends based on tacit action patterns of the user, without a clear profile of the user or clear preference information of the user.

FIGS. 17A and 17B are diagrams showing a friend recommendation screen displayed through a travel application by the first terminal 100, according to an exemplary embodiment.

As shown in FIG. 17A, the user may request a recommendation of a friend to travel with while executing a travel application.

In this case, the first terminal 100 or the friend recommendation server 300 may recommend users having similar interests to those of the user of the first terminal 100 based on the first interest keyword information (in particular, travel related keyword information).

As shown in FIG. 17B, the first terminal 100 or the friend recommendation server 300 may recommend users of external devices, who are interested in travel, as friends to the user of the first terminal 100.

Hereinafter, a method of forming a friendship (or a group) by using a predetermined operation, and sharing contents collected by a predetermined operation with friends (or a group) will be described with reference to FIGS. 18 through 25.

Figure 18:
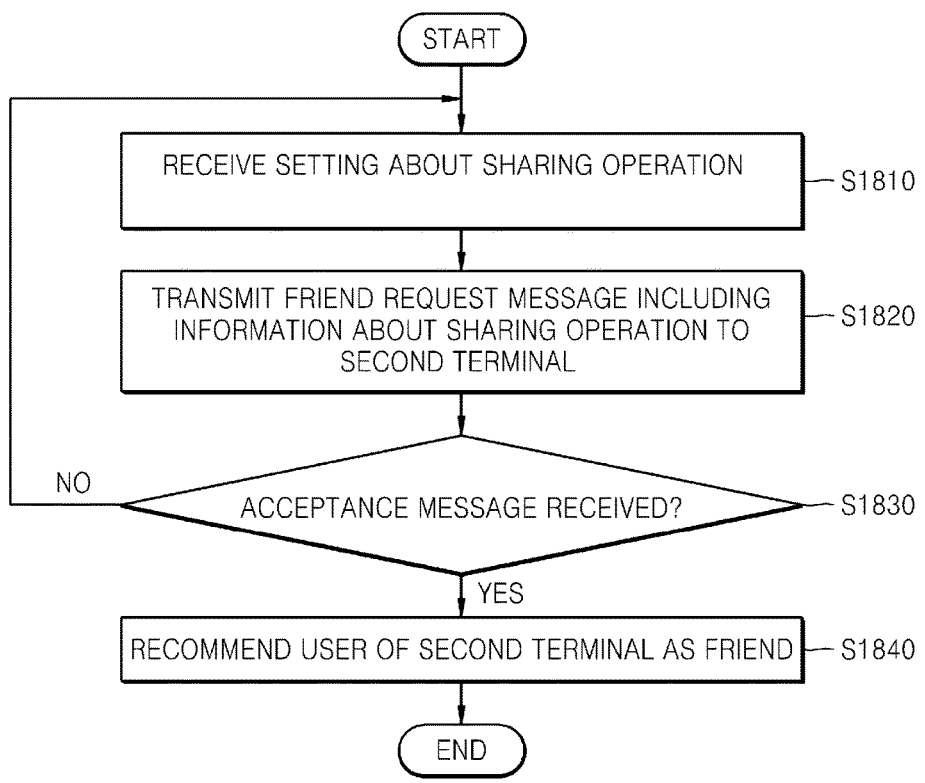
FIG. 18 is a flowchart illustrating a method of recommending friends by using a sharing operation, according to an exemplary embodiment.

FIG. 18 is a flowchart illustrating a method of recommending friends by using a sharing operation, according to an exemplary embodiment.

In operation S1810, the first terminal 100 may receive a setting about a sharing operation for sharing contents. The sharing operation of an exemplary embodiment denotes an operation performed by the user by using a predetermined terminal in order to easily collect contents and share the collected contents with other users.

The sharing operation of an exemplary embodiment may be variously set by the user. For example, the sharing operation according to an exemplary embodiment may include a photographing operation, a moving picture taking operation, a voice recording operation, a screen capturing operation, an application sharing operation and a music playing operation; however, the exemplary embodiments are not limited thereto.

In operation S1820, the first terminal 100 may transmit a friend request message including information about the sharing operation to the second terminal 200. For example, the first terminal 100 may request the second terminal 200 to form a friendship for sharing contents through the sharing operation.

Here, according to an exemplary embodiment, the first terminal 100 may broadcast the friend request message including the information about the sharing operation via short distance communication. Then, the second terminal 200 existing in a communication range of the first terminal 100 may receive the friend request message broadcasted by the first terminal 100.

According to another exemplary embodiment, the first terminal 100 may search for peripheral devices by using the short distance communication (for example, Bluetooth low energy (BLE) communication). In addition, the first terminal 100 selects the second terminal 200 from among found devices, and transmits the friend request message to the second terminal 200.

In operation S1830, the first terminal 100 may receive an acceptance message corresponding to the friend request message, from the second terminal 200. For example, if the user of the second terminal 200 wants to share the contents with the user of the first terminal 100 through the sharing operation, the second terminal 200 may transmit the acceptance message to the friend request message of the first terminal 100 to the first terminal 100.

In operation S1840, the first terminal 100 may recommend the user of the second terminal 200 transmitting the acceptance message as a friend. For example, the first terminal 100 displays identification information of the second terminal 200 or the user identification information of the second terminal 200 that transmits the acceptance message so as to recommend the user of the second terminal 200 as a friend.

According to an exemplary embodiment, if the acceptance message is transmitted from a plurality of second terminals 200, the first terminal 100 may form a sharing group including the user of the first terminal 100 and the users of the plurality of second terminals 200.

FIG. 19 is a flowchart illustrating a method of recommending a friend by using a sharing operation, according to another exemplary embodiment. Detailed descriptions about the same processes as those of FIG. 18 will not be repeated here.

In operation S1910, the first terminal 100 may receive a setting about a sharing operation for sharing the contents and a zone or a location where the sharing operation is applied. That is, the user may set the sharing operation, and may additionally set a predetermined zone in which the content is shared by the sharing operation. In this case, the content sharing between the first and second terminals 100 and 200 by the sharing operation may be possible only when the first terminal 100 and the second terminal 200 are located within the zone where the sharing operation is applied.

The zone where the sharing operation is applied may be a communication range of the first terminal 100, a certain building, or a certain space; however, the exemplary embodiments are not limited thereto. For example, the user may set the short distance communication range of the first terminal 100 as the zone where the sharing operation is applied, set the content sharing to be possible only in a certain building (for example, a museum), or set the content sharing to be possible by the sharing operation only within 5 m from the first terminal 100. In another example, the sharing zone may be a local area network or a personal area network in which the first terminal 100 and the second terminal 200 are connected.

In operation S1920, the first terminal 100 may transmit a friend request message including information about the sharing operation and the zone where the sharing operation is applied to the second terminal 200.

In operation S1930, the second terminal 200 may display the friend request message sent from the first terminal 100 on a screen thereof. The second terminal 200 may display the friend request message as a pop-up window according to an exemplary embodiment. Here, the user of the second terminal 200 identifies the information about the sharing operation and the zone where the sharing operation is applied, and the information about the first terminal 100 or the user of the first terminal 100 included in the friend request message, and may determine whether to accept the friend request or not.

In operation S1940, when the user of the second terminal 200 accepts the friend request of the first terminal 100, the second terminal 200 may transmit an acceptance message to the first request message, to the first terminal 100.

The acceptance message of an exemplary embodiment may include information about the second terminal 200 and information about the user of the second terminal 200. The information about the second terminal 200 may include identification information of the second terminal 200 (for example, a device ID, a device name, and an identification image), information about the communication type supported by the second terminal 200, connection information for connecting to the second terminal 200 (for example, Bluetooth address, profile information, SSID, IP address, MAC address, channel number, and security key). The communication type may be a wireless LAN (ad-hoc mode or infrastructure mode communication), Bluetooth, Zigbee, WFD, or UWB; however, the exemplary embodiments are not limited thereto.

In operation S1950, the first terminal 100 may recommend the user of the second terminal 200 that transmits the acceptance message as a friend. For example, the first terminal 100 may display the identification information of the second terminal 200 or the user identification information (for example, user application information, user profile information, and user images) of the second terminal 200 that transmits the acceptance message on the screen to recommend the user of the second terminal 200 as a friend.

In operation S1960, the first terminal 100 and the second terminal 200 may share the contents collected by the sharing operation. According to an exemplary embodiment, if the zone where the sharing operation is applied is set, the first terminal 100 and the second terminal 200 may share the content collected by the sharing operation within the set zone.

The content collected by the sharing operation according to an exemplary embodiment may vary and may include, for example, audio content, video content, and text content. For example, the content collected by the sharing operation may include photo content, moving picture content, voice record content, music content, and electronic book content; however, the exemplary embodiments are not limited thereto.

Processes of sharing content between the first terminal 100 and the second terminal 200 will be described in more detail below.

In operation S1961, the first terminal 100 may sense the predetermined sharing operation by using sensors. In addition, in operation S1963, the first terminal 100 may transmit first content collected by the predetermined sharing operation to the second terminal 200. Here, according to an exemplary embodiment, the first terminal 100 may transmit the first content directly to the second terminal 200 via the short distance communication, or transmit the first content to the second terminal 200 via a sharing server.

In operation S1965, the second terminal 200 may sense the predetermined sharing operation. Here, the second terminal 200 may transmit second content that is collected by the sharing operation to the first terminal 100 (operation S1967). According to another exemplary embodiment, the first terminal 100 and the second terminal 200 may maintain a list or database of friends that have accepted friend request messages. The list or database may be used to perform the sharing operation.

Therefore, according to an exemplary embodiment, the first terminal 100 and the second terminal 200 may configure a friendship easily by using a predetermined sharing operation, and may share the content collected by the sharing operation with each other. Hereinafter, examples of forming the friendship and sharing the content through the sharing operation will be described with reference to FIGS. 20 through 25.

Figure 20A:
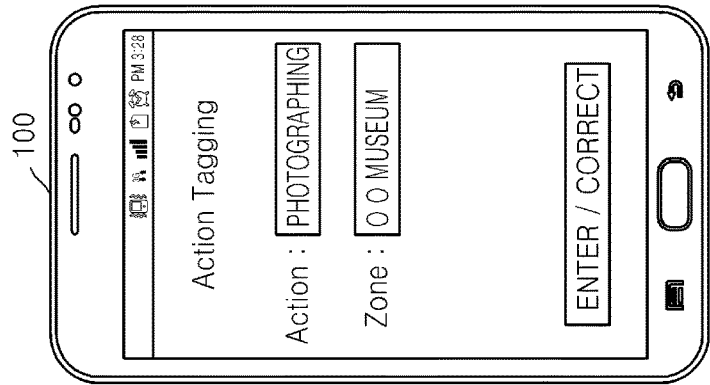
FIGS. 20A through 20C are diagrams illustrating a method of broadcasting a friend request message, according to an exemplary embodiment.
Figure 20B:
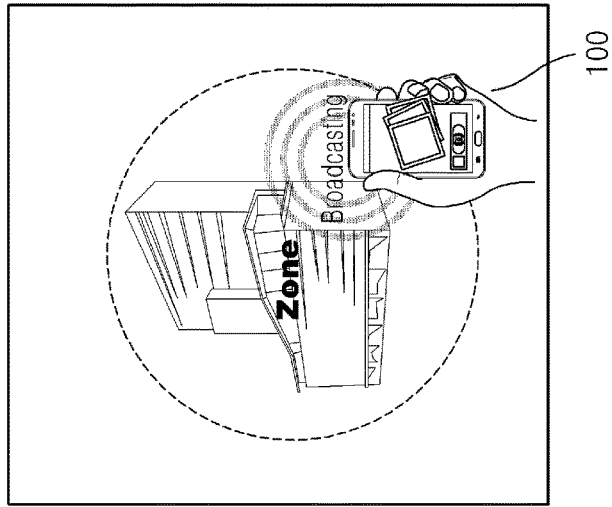
Figure 20C:
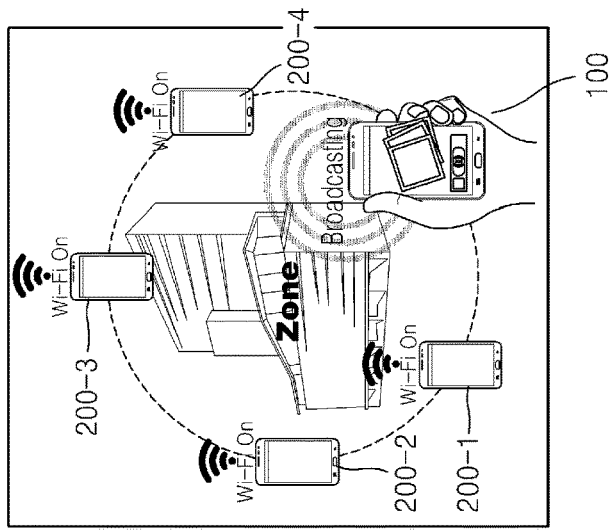

FIGS. 20A through 20C are diagrams illustrating a method of broadcasting a friend request message, according to an exemplary embodiment.

As shown in FIG. 20A, the first terminal 100 may provide the user with a graphical user interface (GUI) through which the sharing operation and the zone where the sharing operation is applied may be set. Here, the user may input or select the sharing operation for sharing the content. For example, the user may select a photographing operation as the sharing operation for sharing the content.

The user may set the zone where the sharing operation is applied. For example, the user may set the content sharing by the sharing operation to be possible only in the zone '** Museum'.

As shown in FIG. 20B, the first terminal 100 may broadcast the friend request message including the information about the sharing operation and the zone where the sharing operation is applied to outside. Here, the first terminal 100 may broadcast the friend request message by using the short distance communication (for example, Wi-Fi communication or BLE communication).

As shown in FIG. 20C, the first terminal 100 may receive acceptance messages from external terminals (for example, a first device 200-1, a second device 200-2, a third device 200-3, and a fourth device 200-4). For example, users of the external terminals identify the information about the sharing operation (for example, the photographing operation) and the zone where the sharing operation is applied (for example, ** Museum) included in the friend request message, and then, may accept the request of the user of the first terminal 100.

The first terminal 100 of an exemplary embodiment may recommend the user of the first device 200-1, the user of the second device 200-2, the user of the third device 200-3, and the user of the fourth device 200-4 as friends.

In addition, the first terminal 100 may form a sharing group with the user of the first device 200-1, the user of the second device 200-2, the user of the third device 200-3, and the user of the fourth device 200-4.

Here, the user of the first terminal 100, the user of the first device 200-1, the user of the second device 200-2, the user of the third device 200-3, and the user of the fourth device 200-4 may share the photos collected through the photographing operations in the zone ** Museum with each other.

Figure 21A:
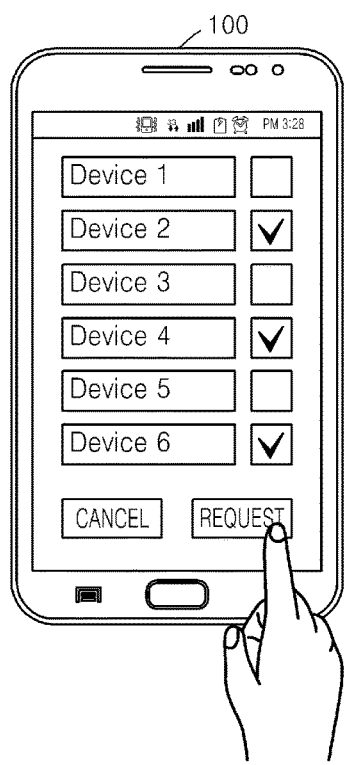
FIGS. 21A and 21B are diagrams illustrating a method of transmitting a friend request message through Bluetooth low energy (BLE) communication.
Figure 21B:
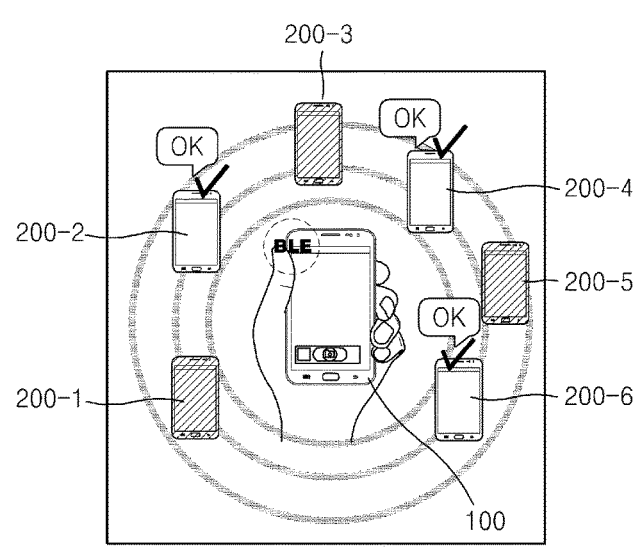

FIGS. 21A and 21B are diagrams illustrating a method of transmitting a friend request message through BLE communication.

As shown in FIG. 21A, the first terminal 100 of an exemplary embodiment may search for peripheral devices that broadcast identification information through BLE communication. For example, the first terminal 100 may find a first device 200-1, a second device 200-2, a third device 200-3, a fourth device 200-4, a fifth device 200-5, and a sixth device 200-6 that broadcast identification information (for example, a device ID, account information, MAC address, etc.) as advertisement packets from a periphery thereof.

Then, the first terminal 100 may display a list of the found first device 200-1, second device 200-2, third device 200-3, fourth device 200-4, fifth device 200-5, and sixth device 200-6.

The user of the first terminal 100 may select at least one device to form a sharing group from the list. For example, the user of the first terminal 100 may select the second device 200-2, the fourth device 200-4, and the sixth device 200-6.

In this case, the first terminal 100 may transmit the friend request message to the at least one device selected by the user (for example, the second device 200-2, the fourth device 200-4, and the sixth device 200-6). The friend request message may include information about the sharing operation and the information about the zone where the sharing operation is applied.

As shown in FIG. 21B, when the first terminal 100 receives acceptance messages in response to the friend request message, from the second device 200-2, the fourth device 200-4, and the sixth device 200-6, the first terminal 100 may form a sharing group with the second device 200-2, the fourth device 200-4, and the sixth device 200-6. In addition, the first terminal 100 may share the content collected by the predetermined sharing operation with the second device 200-2, the fourth device 200-4, and the sixth device 200-6. This will be described with reference to FIGS. 22A and 22B below.

Figure 22A:
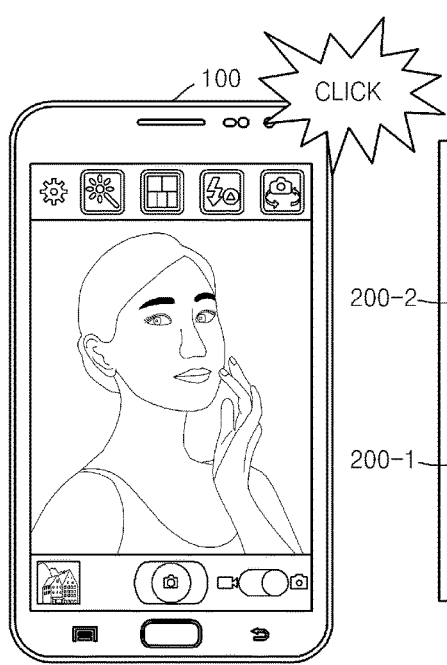
FIGS. 22A and 22B are diagrams illustrating a method of sharing content collected by the sharing operation, according to an exemplary embodiment.
Figure 22B:
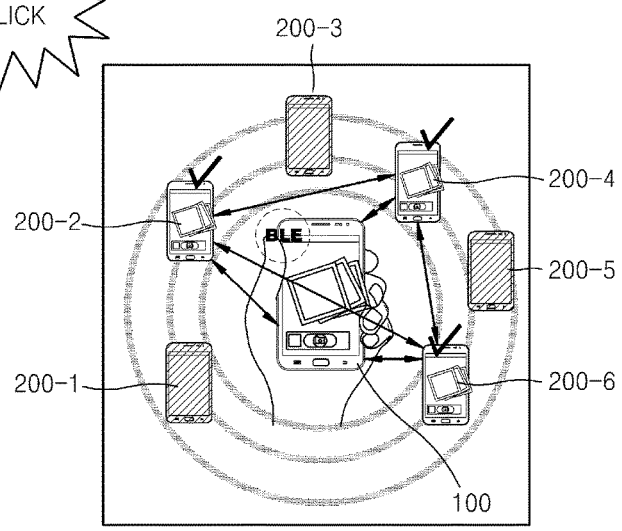

FIGS. 22A and 22B are diagrams illustrating a method of sharing content collected by the sharing operation, according to an exemplary embodiment.

In regard to FIGS. 22A and 22B, a case where the user of the first terminal 100 selects the photographing operation as the sharing operation and selects '** Museum' as the zone where the sharing operation is applied will be described as an example.

As shown in FIG. 22A, the user may capture an image of an external object in the '** Museum' zone by using a camera built into the first terminal 100. In this case, the first terminal 100 may sense the photographing operation that is set as the sharing operation.

As shown in FIG. 22B, upon sensing the photographing operation that is the sharing operation, the first terminal 100 may transmit the photo content through the photographing operation to the second device 200-2, the fourth device 200-4, and the sixth device 200-6 that are included in the sharing group.

Photo content collected by the photographing operations in each of the second device 200-2, the fourth device 200-4, and the sixth device 200-6 may be shared with the second device 200-2, the fourth device 200-4, the sixth device 200-6, and the first terminal 100.

Figure 23A:
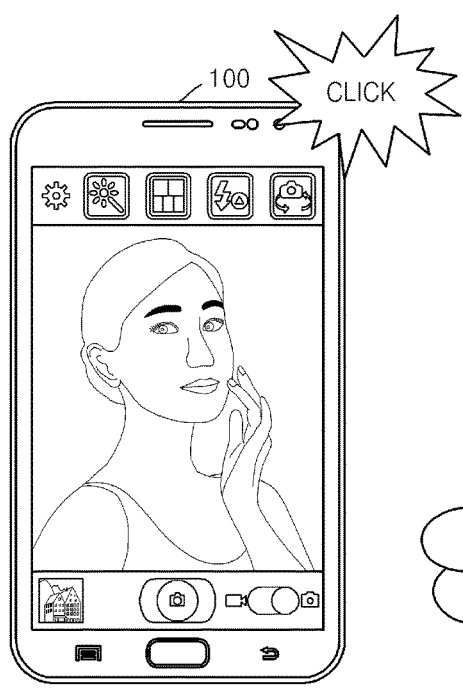
FIGS. 23A and 23B are diagrams illustrating a method of sharing content through a sharing server, according to an exemplary embodiment.
Figure 23B:
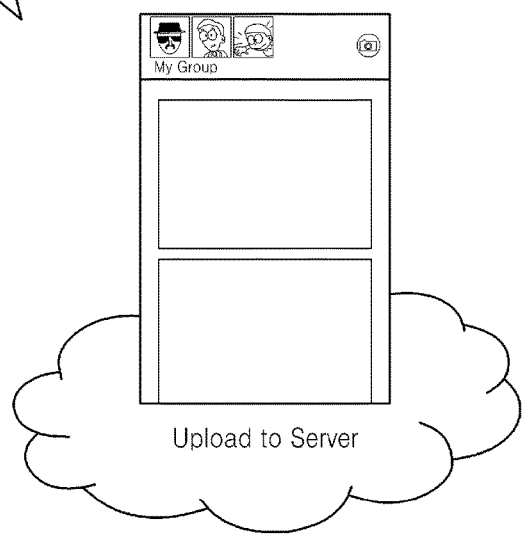

FIGS. 23A and 23B are diagrams illustrating a method of sharing content through a sharing server, according to an exemplary embodiment.

As shown in FIG. 23A, the user may capture an image of an external object by using the camera built in the first terminal 100. In this case, the first terminal 100 may sense the photographing operation that is set as the sharing operation.

As shown in FIG. 23B, when sensing the photographing operation that is the sharing operation, the first terminal 100 may transmit the photo content collected by the photographing operation to the sharing server. Here, each of the second device 200-2, the fourth device 200-4, and the sixth device 200-6 may access the sharing server. Therefore, each of the second device 200-2, the fourth device 200-4, and the sixth device 200-6 may acquire the content collected by the first terminal 100 via the sharing server.

In addition, the content (for example, the photo content) collected by the sharing operation (for example, the photographing operation) in each of the second device 200-2, the fourth device 200-4, and the sixth device 200-6 may be shared through the sharing server.

The sharing server according to an exemplary embodiment may manage the sharing content with respect to the device unit, the sharing group unit, and the account unit.

Figure 24A:
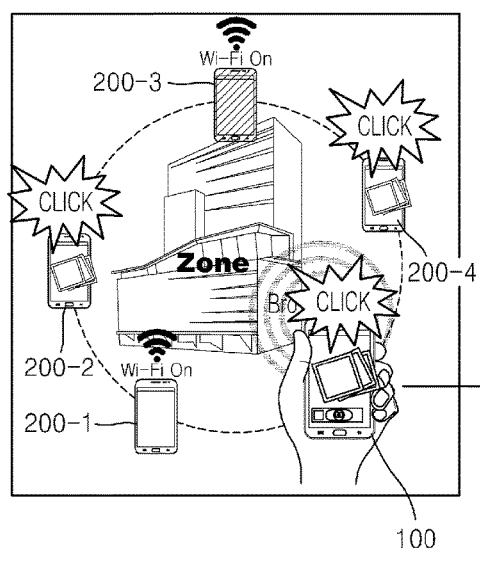
FIGS. 24A and 24B are diagrams showing a screen displaying a content sharing check window, according to an exemplary embodiment.
Figure 24B:
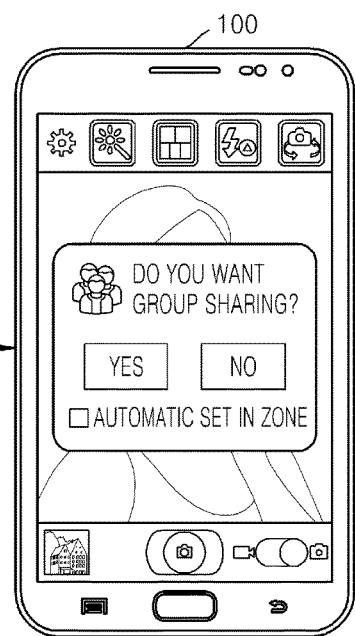

FIGS. 24A and 24B are diagrams showing a screen displaying a content sharing check window, according to an exemplary embodiment.

As shown in FIG. 24A, the first terminal 100 may sense the photographing operation that is set as the sharing operation in advance.

Here, as shown in FIG. 24B, the first terminal 100 may display the content (for example, the photo content) collected by the sharing operation (for example, the photographing operation) on the screen before sharing the content with the second device 200-2 and the fourth device 200-4. The user may determine whether the content is to be shared with the other devices (the second device 200-2 and the fourth device 200-4) after identifying the content displayed on the screen.

For example, if the photo content collected by the photographing operation has a low resolution or the user does not like the photo content, the user of the first terminal 100 may determine not to share the photo content with the second device 200-2 and the fourth device 200-4. If the user likes the photo content, the user of the first terminal 100 may share the photo content with the second device 200-2 and the fourth device 200-4.

FIGS. 25A through 25E are diagrams illustrating a method of sharing content through a sharing panel, according to an exemplary embodiment.

As shown in FIG. 25A, the first terminal 100 may sense a user gesture for requesting a sharing panel 2500. The user gesture for requesting the sharing panel 2500 may vary and may include, for example, a dragging gesture for dragging down a status display bar, and a pushing gesture for pushing a home button a predetermined number of times (for example, twice); however exemplary embodiments are not limited thereto.

As shown in FIG. 25B, the first terminal 100 may provide the sharing panel 2500 in response to the user gesture for requesting the sharing panel 2500. The sharing panel 2500 of an exemplary embodiment denotes a space for displaying activity information of the sharing group (for example, the user of the first terminal 100 and the user of the second terminal 200) that agrees to share the content through the predetermined sharing operation.

The first terminal 100 of an exemplary embodiment may display at least one of the information about the sharing operation that is set in advance (for example, a photographing operation, a music playing operation, etc.), applications relating to the sharing operation (for example, a camera application, a content reproduction application, etc.), and information 2510 about at least one friend (or sharing group) connected through the sharing operation on the sharing panel 2500.

According to an exemplary embodiment, the user may select a camera application 2520 from among the applications relating to the sharing operation on the sharing panel 2500.

In this case, as shown in FIG. 25C, the first terminal 100 may sense the selection of the user on the camera application 2520, and may execute the camera application 2520.

As shown in FIG. 25D, the first terminal 100 may display an image captured by the camera. Here, when receiving an upload request of the captured image from the user, the first terminal 100 may upload the captured image to the sharing server as shown in FIG. 25E. Otherwise, the first terminal 100 may transmit the captured image directly to the second terminal 200.

The above exemplary embodiments may be implemented in the form of executable program commands through a variety of computer means and recorded on computer readable media. The computer readable media may include solely or in combination, program commands, data files and data structures. The program commands recorded on the media may be components specially designed for the exemplary embodiments or may be usable by one of ordinary skill in the art of computer software. Computer readable recording media include magnetic media such as a hard disk, a floppy disk, and a magnetic tape, optical media such as a CD-ROM and a DVD, magneto-optical media such as a floppy disk and hardware devices such as ROM, RAM and flash memory specially designed to store and carry out programs. Program commands include not only machine language code generated by a complier but also high level code that can be used by an interpreter etc., which is executed by a computer.

According to an exemplary embodiment, a user may be recommended a friend having a common interests based on interest keyword information that is extracted by collecting and analyzing event information in each of terminals owned by users. Therefore, the user may be recommended a friend having common interests, and thus, the users may easily share useful information with each other.

While exemplary embodiments have been particularly shown and described with reference to the drawings, it will be understood by those of ordinary skill in the art that various changes in form and details may be made therein without departing from the spirit and scope of the inventive concept as defined by the following claims.

What is claimed is:

1. A method of recommending a friend, performed by a first terminal, the method comprising:
    detecting an event occurring in the first terminal;
    in response to analyzing the detected event, when it is determined that the detected event is a command to perform a sharing operation for sharing content and to select a zone to perform the sharing operation,
        transmitting a friend request message including information about the zone and the sharing operation to a second terminal,
        in response to receiving a friend acceptance message from the second terminal, displaying, on a screen of the first terminal, information recommending a user of the second terminal as a friend,
        sharing content, which is created within the zone on the first terminal with the second terminal, wherein the sharing of the content is performed while the first terminal and the second terminal are within the zone; and
    in response to analyzing the detected event, when it is determined that first interest keyword information is generated by the first terminal,
        receiving second interest keyword information of the second terminal,
        comparing the first interest keyword information and the second interest keyword information, and
        displaying, on the screen of the first terminal, information recommending a user of the second terminal as a friend based on a result of the comparing.

2. The method of claim 1, further comprising:
    collecting event information in the first terminal,
    wherein the collecting of the event information comprises collecting at least one from among location information of the first terminal, network information, user status information, sent/received message information, phone call history information, social networking service (SNS) usage information, application usage information, web page usage information, and payment information.

3. The method of claim 2, wherein the generating the first interest keyword information comprises selecting at least one first interest keyword by analyzing the event information, and
    wherein the first interest keyword information comprises the at least one first interest keyword and at least one from among first location information and first time information corresponding to the first interest keyword.

4. The method of claim 1, wherein the generating the first interest keyword information comprises generalizing at least one keyword obtained from the event information into a higher level word according to a predetermined hierarchical lexical database,
    wherein the generalizing the event information comprises setting a generalization level for the generalizing the event information into the higher level word.

5. The method of claim 3, wherein the selecting the at least one first interest keyword comprises:
    extracting a plurality of candidate keywords by analyzing the event information; and
    selecting the at least one first interest keyword from among the plurality of candidate keywords based on a number of times each of the plurality of candidate keywords is extracted.

6. The method of claim 1, wherein the receiving of the second interest keyword information comprises receiving second interest keyword information comprising a second interest keyword that is generalized as higher level information based on event information of the second terminal.

7. The method of claim 6, wherein the second interest keyword information further comprises at least one from among second location information and second time information mapped to the second interest keyword.

8. The method of claim 1, wherein the receiving of the second interest keyword information from the second terminal is performed through at least one from among a wireless local area network (LAN), a near field communication (NFC), Bluetooth, Zigbee, Wi-Fi Direct (WFD), and ultra wideband (WUB) communication.

9. The method of claim 1, wherein the displaying the information recommending a user of the second terminal as a friend based on the generating of the first interest keyword information comprises:

calculating a similarity between the first interest keyword information and the second interest keyword information based on the result of the comparing; and displaying the information recommending the user of the second terminal as the friend if the similarity is a predetermined value or greater.

10. The method of claim 1, further comprising deleting the second interest keyword information after a predetermined time has passed.

11. A non-transitory computer-readable recording medium having embodied thereon a program for executing the friend recommending method of claim 1.

12. A first terminal for recommending a friend, the first terminal comprising:
a display;
a communication interface; and
a controller which is configured to:
detect an event occurring in the first terminal,
in response to analyzing the detected event, when it is determined that the detected event is a command to perform a sharing operation for sharing content and to select a zone to perform the sharing operation, control the communication interface to transmit a friend request message including information about the zone and the sharing operation to a second terminal, control the display to display information recommending a user of the second terminal as a friend in response to receiving a friend acceptance message from the second terminal via the communication interface, and control the communication interface to share content that is created within the zone on the first terminal with the second terminal, wherein the sharing of the content is performed while the first terminal and the second terminal are within the zone, and
in response to analyzing the detected event, when it is determined that first interest keyword information is generated by the first terminal, control the communication interface to receive second interest keyword information of the second terminal, compare the first interest keyword information and the second interest keyword information, and control the display to display information recommending a user of the second terminal as a friend based on a result of the comparing.

13. The first terminal of claim 12, wherein the controller is further configured to collect event information in the first terminal, and
wherein the event information comprises at least one from among location information of the first terminal, network information, user status information, sent/received message information, phone call history information, social networking service (SNS) usage information, application usage information, web page usage information, and payment information.

14. The first terminal of claim 13, wherein the controller is further configured to analyze the event information to select at least one first interest keyword, and
wherein the first interest keyword information comprises the at least one first interest keyword and at least one from among first location information and first time information corresponding to the first interest keyword.

15. The first terminal of claim 12, wherein the controller is further configured to generate the first interest keyword information by generalizing at least one keyword obtained from event information of the first terminal into a higher level word according to a predetermined hierarchical lexical database,
wherein the controller is further configured to generalize the at least one keyword obtained from the event information into the higher level word by setting a generalization level for the generalizing the at least one keyword obtained from the event information into the higher level word.

16. The first terminal of claim 14, wherein the controller is further configured to select the at least one first interest keyword by extracting a plurality of candidate keywords from the event information, and select the at least one first interest keyword from among the plurality of candidate keywords based on a number of times each of the plurality of candidate keywords are extracted.

17. The first terminal of claim 12, wherein the controller is further configured to control the communication unit to receive second interest keyword information comprising a second interest keyword that is generalized as higher level information based on event information of the second terminal.

18. The first terminal of claim 17, wherein the second interest keyword information further comprises at least one from among second location information and second time information mapped to the second interest keyword.

19. The first terminal of claim 12, wherein the communication unit is configured to communicate with the second terminal through at least one from among a wireless local area network (LAN), a near field communication (NFC), Bluetooth, Zigbee, Wi-Fi Direct (WFD), and ultra wideband (WUB) communication.

20. The first terminal of claim 12, wherein the controller is further configured to calculate a similarity between the first interest keyword information and the second interest keyword information based on the result of the comparing, and control the display to display information recommending the user of the second terminal as the friend if the calculated similarity is a predetermined value or greater.

21. The first terminal of claim 12, wherein the controller is further configured to delete the second interest keyword information after a predetermined time has passed.

22. The method of claim 1, wherein the comparing comprises comparing a plurality of first feature vectors of the first interest keyword information and a plurality of second feature vectors of the second interest keyword information.

23. The first terminal of claim 12, wherein the controller compares the first interest keyword information and the second interest keyword information by comparing a plurality of first feature vectors of the first interest keyword information and a plurality of second feature vectors of the second interest keyword information.

* * * * *